United States Patent
Geist

(10) Patent No.: US 6,771,423 B2
(45) Date of Patent: Aug. 3, 2004

(54) HEAD-MOUNTED VIRTUAL DISPLAY APPARATUS WITH A NEAR-EYE LIGHT DEFLECTING ELEMENT IN THE PERIPHERAL FIELD OF VIEW

(75) Inventor: Richard Edwin Geist, Grosse Ile, MI (US)

(73) Assignee: Richard Geist, Grosse Ile, MI (US)

( * ) Notice: Subject to any disclaimer, the term of this patent is extended or adjusted under 35 U.S.C. 154(b) by 13 days.

(21) Appl. No.: 10/335,785

(22) Filed: Jan. 2, 2003

(65) Prior Publication Data

US 2003/0184868 A1 Oct. 2, 2003

Related U.S. Application Data

(63) Continuation-in-part of application No. 09/849,872, filed on May 7, 2001, now abandoned.

(51) Int. Cl.[7] ............................. G02B 27/14; G09G 5/00
(52) U.S. Cl. ............................................ 359/630; 345/8
(58) Field of Search .......................... 359/13, 630–633; 345/7–9; 348/115

(56) References Cited

U.S. PATENT DOCUMENTS 5,539,422 A * 7/1996 Heacock et al. ............ 359/631
6,359,602 B1 * 3/2002 Amafuji et al. ................ 345/8

* cited by examiner

Primary Examiner—Georgia Epps
Assistant Examiner—Alicia M. Harrington

(57) ABSTRACT

The present invention is a head-mounted virtual display apparatus based on a cross-cavity optical configuration, in which a near-eye light deflecting element (LDE) is located in the peripheral field of view. Positioning of the near-eye LDE in the peripheral field of view provides the user simultaneously with "look toward" access to an inset magnified image of a miniature display and an unobstructed forward field of view of at least 35 degrees. Active and passive alignment means, including articulating connections and image warping electronics, allow correction of geometric distortion arising from folding of the optical train and/or embodiments based on off-axis optical configurations.

26 Claims, 4 Drawing Sheets

HEAD-MOUNTED VIRTUAL DISPLAY APPARATUS WITH A NEAR-EYE LIGHT DEFLECTING ELEMENT IN THE PERIPHERAL FIELD OF VIEW

CROSS REFERENCE TO RELATED APPLICATIONS

This application is continuation-in-part of U.S. patent application Ser. No. 09/849,872, filed May 7, 2001 now abandoned.

BACKGROUND OF INVENTION a) Field of the Invention

The present invention relates to a head-mounted virtual display apparatus (VDA) based on a cross-cavity optical configuration with an unobstructed forward field of view. More particularly, a near-eye light deflecting element (LDE) located in the peripheral field of view provides "look toward" access to an inset magnified image of a miniature display. Active and passive alignment means, including articulating connections and image warping electronics, allow correction of geometric distortion arising from folding of the optical train and/or embodiments based on off-axis optical configurations.

b) Description of the Prior Art

The head-mounted display (HMD) field has evolved on a number of fronts over the past 20 years. The earliest development by the military focused on wide field of view (FOV), see-through helmet-mounted displays for aircraft guidance and weapon aiming applications, in which the virtual image overlies the ambient environment. Since then development has included lightweight monocular HMDs for workplace wearable computer systems, binocular HMDs for full-immersion viewing of video and virtual reality applications, and various types of see-through displays for augmented reality applications.

Monocular HMDs are designed to provide access to electronic information while obscuring only a portion of the forward and peripheral fields of view. A typical monocular HMD approach places the display and optics directly in front of one eye, such that the forward FOV of that eye is partially or fully occluded and the peripheral FOVs of one or both eyes is partially occluded. The most common example of this type of monocular HMD is a boom style HMD, in which the viewable element (and often the display) is positioned in front of the face at the end of a cantilever arm. The main advantages of a boom style HMD include its relative simplicity (i.e., its one size fits all nature and minimal number of adjustments) and its construction flexibility, in that it can be added to a pair of spectacles or any head-borne structure, or can be constructed as a stand-alone headset. The disadvantages of a boom style HMD include a physical boundary that extends a distance from the face, occlusion of a portion of the forward FOV, and its suitability primarily for stationary activities due to vibration of the cantilever arm during user motion.

A second monocular HMD approach integrates the virtual display elements, in part or in full, into a pair of spectacles, with the aim of not significantly altering its form or weight. This approach allows the display and optics to be kept closer to the face, thus making it possible to limit the occluded FOV to one eye and, in some cases, to only a small portion of the peripheral FOV. The compact nature of a glasses-mounted display (GMD), however, generally requires a folding of the optical train, which increases the complexity of the construction.

In general, monocular HMDs can be categorized according to whether the optical train is an on-or off-axis configuration. In an on-axis optical configuration, the optical axis of each powered optical element is coincident with the optical train axis or illumination path (with the exception of unpowered LDEs used to "turn corners"). No optics are "tilted" with respect to the optical train axis. Off-axis optical configurations, on the other hand, generally include at least one powered optical element whose optical axis is tilted with respect to the optical train axis. Off-axis optical configurations allow more compact constructions but suffer from higher levels of aberrations.

Monocular HMDs can be further categorized according to the nature of the magnification system, of which there are two basic types: simple and compound magnification systems. A simple magnification system (or simple magnifier) is a single stage, non-pupil forming magnification system (i.e., a magnification system that does not form a real exit pupil), which is composed of either a positive refractive or reflective element, or multiple adjacent refractive elements with no spacing between them. A compound magnification system, on the other hand, is a pupil forming magnification system typically composed of two or more distinct stages. In a compound magnification system, the stage closest to the object is termed the objective or relay, while the stage viewed by the eye is termed the eyepiece or ocular. In a two stage compound magnification system, the objective forms an "intermediate" image (either real or virtual) that is the "object" projected virtually by the eyepiece. For the purposes of this invention, a third type of magnification system—termed a compound eyepiece—is defined as one in which multiple refractive and reflective elements (including the eyepiece) are in close proximity to one another with spacing between at least two of the elements. A compound eyepiece is effectively a single stage (pupil-forming) magnification system, which is typically located closer to the eye than it is to the display. Put another way, the distance between the display and the first magnifying element (or the "objective") of the system is typically greater than the distance between the first magnifying element and the eyepiece. For a compound magnification system the converse typically holds. For example, consider an HMD with a display located above the eye and a compound eyepiece located below the eye, which is formed from a single block of material and includes three magnifying surfaces: a refractive entrance surface, a reflective intermediate surface and a refractive exit surface. This device includes multiple spaced magnifying elements (so it cannot be categorized as a simple magnification system) and the distance between the entrance and exit surfaces (or the "objective" and "eyepiece" for comparison purposes) is less than the distance between the display and the "objective". Thus, the magnifying power is not distributed throughout the optical train like a two stage, compound magnification system.

The design of an HMD involves two generally conflicting aims: (i) achieving a high quality, computer monitor sized virtual image (i.e., a virtual image with a diagonal dimension of at least 10 inches and preferably 15 inches or greater) at a desired apparent image distance (such as a workstation distance of about 24 inches) and (ii) the desire for a compact, lightweight format. One method of balancing these aims is through the use of lightweight, reflective or light deflecting elements (LDEs), such as a mirror constructed from a plastic substrate and a reflective film. In addition, powered and unpowered LDEs may be used to increase magnification (the latter by increasing the optical train path length) and to distribute the weight of the optics more evenly about the head.

A monocular HMD for mobile activities must present a stationary virtual image to the eye during user motion. This requires that the support frame be stably secured to the head and that the display and optics be stably secured to the frame. Taking user comfort into account, the former requirement is best satisfied by a support frame in contact with both ears and the bridge of the nose; while the latter requirement negates the use of a relatively long, thin cantilever arm as the support structure for attaching the eyepiece to the frame, since this type of structure is susceptible to vibration during user motion. For safety and performance reasons, another key requirement for a mobile activity HMD is unobstructed forward vision.

For the purposes of the present invention, the head-mounted display field is further categorized according to: (i) whether the device is suitable for mobile activities; (ii) the optical configuration obstructs normal forward vision; and (iii) whether the optical configuration is a cross-cavity optical configuration (CCOC) or a non-cross-cavity configuration (non-CCOC).

As defined by Geist in U.S. patent application Ser. No. 10/216,958, incorporated herein by reference in its entirety, a cross-cavity optical configuration is an optical configuration in which at least two elements of the optical train lie on opposite sides of the ocular cavity, such that when the system is properly aligned (using articulating alignment means), the light path crosses directly in front of a forward gazing eye. In addition, a mobile activities HMD is defined by Geist as an HMD with an unobstructed forward line-of-sight of at least 35° and an unshakeable head-borne mounting (i.e., a head-mounted support in contact with the bridge of the nose and at least two additional areas of the side(s) and/or back of the head, such that the resulting three contact areas provide a stable, unshakeable platform for the optical train). Suitable mobile activities head-mounted supports include, but are not limited to, conventional eyewear, goggles held in place with a strap or headband, and a headset style head-borne support in contact with one ear and/or the side of the head, in addition to the bridge of the nose.

A key factor in compact HMD designs is the level of optical aberrations or image degrading factors. For the purposes of this invention, image degrading factors are divided into two general categories.

The first category of image degrading factors includes all types of geometrical distortions, including those inherent in most off-axis optical configurations. In general, geometric distortion represents the inability of the system to correctly map the shape of the object into image space (i.e., geometrical distortion represent mapping errors). In the case of conventional, symmetric distortion (commonly referred to as barrel and pincushion distortion), the image appears warped (or bowed) inwards or outwards. In the case of keystone distortion, a difference in path length from one area of the object to another results in a trapezoidal shaped image for a nominally rectangular object. Keystone distortion arises in off-axis projection systems and in optical systems when the optical axis of a powered optic is not perpendicular to the plane of the object (e.g., when the magnifying stage is tilted with respect to the display or vice versa). Keystone distortion is inherent in most off-axis HMD optical configurations, as are some higher-order, asymmetric types of geometric distortion.

One of the most detailed analyses to date of geometric distortion in off-axis or non-axially symmetric optical configuration was reported by J. S. Sasian and is entitled *Image Plane Tilt in Optical Systems* (SPIE No. 1527, Current Developments in Optical System Design and Optical Engineering, 1991), and is incorporated herein in its entirety. A modified form of the Scheimpflug condition is derived for a bilaterally symmetric system $$A_n u^1 \tan(\theta') - u \tan(\theta) = G + W_{image\ tilt}$$

in which $A_n$ is the coefficient of image anamorphism; u and u' are the angles of the marginal paraxial ray with respect to the optical axis in the object and image space, respectively; $\theta$ and $\theta'$ are the tilt angles of the object and image planes, respectively, relative to a plane perpendicular to the optical axis; G is a coefficient associated with the breaking of axial symmetry; and $W_{image\ tilt}$ is a coefficient associated with image plane tilt arising from optical aberrations. For an axially symmetric system with a tilted object plane, $A_n=1$ and G=0, and the regular Scheimpflug condition holds. When G is non-zero, tilting of the image plane may occur, even when the object plane is perpendicular to the optical ray axis. A relevant and interesting example with regard to the present invention is that of prism. While G=0 for a prism and a flat mirror, $W_{image\ tilt}$ is non-zero for a prism due to coma (since the stop of the system is not located at the surface of the element), which leads to the familiar fact that the image plane tilt is one-third of the prism angle. As further noted by Sasian, keystone or trapezoidal distortion is closely related to image plane tilt. The coefficient of keystone distortion is defined as:

$$K = m \frac{\tan(\theta_f) - \tan(\theta)}{f} = -A_n \frac{\tan(\theta'_f) - \tan(\theta')}{f}$$

in which m is the magnification, f is the front focal length, and $\theta_f$ and $\theta'_f$ are the angles of tilt of the front and back-focal planes, respectively.

The purely geometric nature of these types of image degrading factors allow them to be quantified and the display images predistorted (i.e., compensated electronically or computationally) in such a way as to cancel out the geometric distortion generated by the optics. Presently a number of companies offer image warping chips for this purpose. For example, the LEHK-3C display controller from Liesegang Electronics is capable of predistorting images to correct for the aforementioned geometrical distortions. When applicable, this approach is particularly useful in HMD constructions since it allows the number of elements in the optical train to be kept to a minimum.

In practice, however, unless the distortion is of a fixed, unchanging nature, some means of adjusting the position and/or orientation of at least one optical train element is generally required to minimize or eliminate sources of geometric distortion in a multi-user HMD.

The second category of image degrading factors are those that cause a decrease in image sharpness or quality and include chromatic aberrations, astigmatism, coma and spherical aberrations, among others. This category of image degrading factors must be addressed through the use standard optical design techniques (which typically involves using multiple optical elements, surfaces and/or coatings to achieve a desired set of optical parameters, such as image magnification, exit pupil size, exit pupil location, etc.) while maintaining a level of image sharpness acceptable to the eye. For example, the off-axis optical configurations of most wide FOV, see-through HMDs suffer from a higher degree of coma, astigmatism and higher-order asymmetric distortion than a comparable on-axis optical configuration. The predominate image-degrading aberration of most off-axis optical configurations is third-order astigmatism, which, in the case of wide field of view HMDs, is typically minimized through the use of a toroidal reflective eyepiece.

Proper orientation and alignment of the observable virtual image is a key factor in user comfort and extended use of an HMD. Orienting a real image, such as a written document or computer screen, at a comfortable viewing angle is an every day activity. Quantitatively, orientation of the observable virtual image plane (VIP) is defined in terms of angles $\alpha$ and $\beta$ (FIG. 1). Three groups of $\alpha$ and $\beta$ values are pertinent to the present discussion. The first group corresponds to the case when the observable VIP is normal to the optical axis between the eye and the image plane, i.e., when $\alpha=\beta=90°$. This corresponds to the image orientation when viewing an object at optical infinity and, for the purposes of this invention, is termed two-dimensional orthogonality. The second group of values of interest is when $\beta$ differs from 90° and the image plane is tilted in an undesirable way. The third case of values is an acceptable deviation from two-dimensional orthogonality corresponding to a slight forward or backwards tilting of the observable VIP and is defined herein as one-dimensional orthogonality: $\beta=90°$ and $120° \geq \alpha \geq 70°$. Briefly summarizing, it is not generally acceptable to a viewer for $\beta$ to deviate from 90°, but some deviation from two-dimensional orthogonality may be acceptable (to many users) and may be preferable for certain user specific tasks.

It follows that a mobile activities HMD satisfying two-dimensional orthogonality (or one-dimensional orthogonality with a variable) generally requires one or more moveable/articulating connections to align the optical train with the eye of different users.

A number of boom-style or cantilever arm type HMDs have appeared in the prior art that do not obscure normal forward vision (such as U.S. Pat. No. 4,869,575 disclosed by Kubik) but are not suitable for mobile activities due to vibration of the cantilever arm during user motion. In addition a common disadvantage of this type of HMD is the inability to moveably and independently adjust the near-eye LDE (also commonly referred to herein as the near-eye optic).

Prior art based on a non-CCOC include disclosures by Kurtz (WO 98/29775) and Geist (U.S. patent application Ser. No. 10/216,958). Kurtz discloses a mobile activities HMD based on a non-CCOC, wherein a pair of miniature displays and optical means are positioned above eye level. However, no alignment means-are provided to establish one- or two-dimensional orthogonality (or more commonly referred to herein simply as orthogonality) for different users. Geist provides the alignment means necessary to establish orthogonality for different users, but the alignment means for a non-CCOC differ from those required for a CCOC.

Prior art based on an CCOC include Furness et. al. (U.S. Pat. No. 5,162,828), Heacock et. al. (U.S. Pat. No. 5,539,422), Bettinger (U.S. Pat. No. 4,806,011), Spitzer (U.S. Pat. No. 5,886,822), Holakovszky et. al. (U.S. Pat. No. 5,129,716), Wells et. al. (U.S. Pat. No. 5,334,991) and Beadles and Balls (U.S. Pat. No. 5,648,789). Many of the embodiments of these inventions can be classified as mobile activities HMD. However, none of these inventions provide the alignment means necessary to orthogonally align the observable virtual image plane for different users when the near-eye optic is located in the peripheral FOV and normal forward vision is completely unobscured.

The head-mounted virtual display apparatus of Furness et. al. employs a simple magnification system (consisting of either a single aspheric mirror or a single positive lens with a flat mirror for the near-eye LDE) to project a virtual image at a fixed distance from the eye. A pivoting adjustment changes the angle of the near-eye LDE relative to the eye to provide a first alignment means. Furness et. al. does not, however, provide the second alignment means necessary to establish orthogonality.

The head-mounted virtual display apparatus of Heacock et. al. attaches a multi-element or compound eyepiece to a spectacle-type frame. The alignment means provided by Heacock et. al, however, are insufficient to establish orthogonality for different users since the display and eyepiece are not both simultaneously adjustable (i.e., the display is fixed in place while the eyepiece is adjustable). Moreover, Heacock et. al. restricts the location of the near-eye LDE to below eye level.

Bettinger creates a GMD by adding an illumination source and off-axis optical train to a standard pair of spectacles. The key feature of Bettinger is the use of the lens surface as the substrate for a reflective near-eye LDE (i.e., for a concave mirror formed by coating a portion of the spherical lens surface with a reflective material). Bettinger does not provide the moveable connections necessary to orthogonally align the observable VIP for different users. In addition, Bettinger does not allow modification of the conventional spectacle frame form. Moreover, Bettinger does allow the near-eye LDE to be independent of and nonintegral with the lens, or permit the use of aspheric lenses. Furthermore, Bettinger does not allow the near-eye LDE to be a flat mirror or allow the curvature of the near-eye LDE to be readily varied, since the construction is limited to standard lens curvatures.

Spitzer fully integrates the optics and electronics for a monocular HMD into a pair of eyeglasses. A transparent or semi-transparent LDE embedded in a spectacle lens is used to superimpose a virtual image on the wearer's field of view, where a portion of the optical pathway is required to be internally disposed within the lens. Spitzer does not provide means for articulating the near-eye LDE (or an adjacent LDE) as is necessary to orthogonally align the observable VIP for different users. In addition, Spitzer does not allow the optical pathway to be entirely external of the lens, nor allow the near-eye LDE to be independent of and nonintegral with the lens.

Holakovszky et al. disclose a stereoscopic, spectacle-type virtual display apparatus in which a pair of relay mirrors (i.e., near-eye optics) are positioned in the normal forward FOV to redirect the light path to the user's eyes. In addition, Holakovszky et al. does not provide the alignment means necessary to orthogonally align the observable VIP for different users when the near-eye optics are located the normal peripheral FOV. Thus, Holakovszky et al. cannot provide the unobstructed forward vision required for use during mobile activities. Wells et. al. disclose a stereoscopic, spectacle-type virtual display apparatus in which a pair of pivoting (transparent or opaque) relay mirrors, positioned in the normal forward FOV and driven by individual scanning mirror mechanisms, project separate but equivalent scanned images to the user's eyes. Wells et. al. does not provide the alignment means necessary to locate the near-eye optics in the normal peripheral FOV Beadles and Balls disclose a spectacle-type virtual display apparatus for superimposing alphanumeric text on the forward FOV (of a user watching a live or video performance) for the purposes of closed captioning. In all embodiments of the invention, a beamsplitter partially obscures the normal forward FOV.

SUMMARY OF THE INVENTION

In order to overcome the above-mentioned deficiencies and problems in the prior art, this invention teaches a method of constructing an HMD for mobile activities based on a cross-cavity optical configuration, in which the near-eye optic is located in the peripheral field of view.

1. Objects of the Invention

A general object of this invention is to provide a virtual display apparatus, for temporary or permanent attachment to a head-mounted apparatus, that does not obstruct forward vision and thus is suitable for mobile activities.

Another general object of this invention is to provide a virtual display apparatus for mobile activities of modular construction, with individual and detachable assemblies for the illumination source and optics.

2. Features of the Invention

In keeping with these objects and others that will become apparent hereinafter, one feature of the invention resides, briefly stated, is a virtual display apparatus in which the illumination source is viewed indirectly via a near-eye light deflecting element.

A further feature of the invention resides in a virtual display apparatus with an inset image located anywhere in the peripheral FOV, such that normal forward vision (as defined herein) is unobstructed.

A still further feature of the invention resides in the use of active and passive alignment means, including moveable connections, extended LDEs and image warping electronics, to minimize or eliminate geometric distortion due to tilting of the observable virtual image plane.

A still further feature of the present invention resides in a selection of light deflecting means for the near-eye optic, including spherical and aspherical mirrors, and partially transparent mirrors.

A still further feature of the present invention resides in the use of distinct assemblies for the illumination source, near-eye optic, (adjacent and non-adjacent) folding optics and any additional optics (thus providing modular construction capability).

A still further feature of the present invention resides in freedom to place elements of the virtual display apparatus completely or partially within the boundary of a head-mounted support frame or completely outside the boundary of a head-mounted support frame.

As used herein, the terms magnification or magnifying are sometimes used to denote both magnification and demagnification. Accordingly, the terms magnification and magnifying encompass, and are sometimes used herein to denote, magnification of greater than one, demagnification of less than one and unit magnification. In addition, the terms powered and unpowered are used herein to refer to optical elements with non-zero and zero diopter values, respectively.

As used herein, conventional eyewear refers to all varieties of prescription and non-prescription eyeglasses (or spectacles) including, but not limited to, sunglasses, computer glasses and safety glasses. Common features of conventional eyewear include a structural support frame that uses both ears and the bridge of the nose for support, weight bearing and stabilization during user activity; and individual lenses covering each eye, which are attached and connected to the support frame. The support frame of conventional eyewear is typically comprised of three principal elements: two temples or earpieces, which rest atop the ears and extend from behind the ears to near the temple, and a lens holder, which extends from temple to temple and rests atop the bride of the nose via an integral or removably attached nosepiece or bridge support. The temples of conventional eyewear are typically, but not exclusively, movably attached to the lens holder. Integral or single-piece support frames are also known. In addition, the lens holder of conventional eyewear typically, but not exclusively, includes means for detachably mounting the lenses to the lens holder. Lens/lens holder combinations with the lenses rigidly, but not permanently, affixed to the lens holder are also known, as are integral lens/lens holders.

For the purposes of this invention, the term light deflection means refers to any type of optical element with substantial reflective characteristics. This includes partially and fully reflective mirrors, optical elements based on total internal reflection (such as a non-dispersing, reflecting prism), and holographic optical elements transcribed with reflective properties. The reflective properties of a mirror depend on the nature of the reflective coating applied to the supporting substrate (which may be glass, plastic or other appropriate material). The reflective layer is typically created by depositing a metal coating (such as aluminum or silver) or affixing a reflective polymer film using an adhesive or other standard bonding method. The substrate's surface contour may take any non-planar or curving form (e.g., a spherical, toroidal or parabolic surface contour).

Image placement refers to changing the apparent distance from the eye of a focused observable virtual image. Image placement plays a key role in minimizing eye (muscle) fatigue and possible user discomfort during extended periods of HMD use. The standard approach to reducing eye fatigue is to place the virtual (or apparent) image at an apparent (or perceived) distance comparable to that of the primary objects in the user's forward FOV in order to minimize accommodation when the eye switches back and forth between the virtual image and the primary objects. For example, rather than having the virtual image at a standard reading distance of 250 mm, a person working at a computer may wish to perceive the image at a workstation distance of 600 mm to minimize the need for accommodation by the eye when switching between the real image of the computer screen and the inset virtual image of the present invention. This may be accomplished by either fixing the apparent distance based on the primary task of the wearer or by including an adjustment to allow the user to change the apparent distance according to the task at hand.

Furthermore, focusing or focus control refers to the placement of a sharp, resolute virtual image (i.e., an image in which aberrations are sufficiently low to prevent blurring of pixel detail) within the region defined by a user's near point (i.e., the closest a person can clearly view an object) and far point (i.e., the farthest they can clearly view an object).

It will be understood by one of ordinary skill in the art that when an articulating means is employed to move the near-eye optic (and any underlying support elements) outside the normal peripheral FOV, latching mechanisms may be used to temporarily secure the near-eye optic in its functional and non-functional positions.

It will be further understood by one of ordinary skill in the art that standard techniques for minimizing glare and wash-out from external and internal sources of illumination, such as anti-reflective coatings, opaque coatings, opaque baffling, opaque housings, etc., may be required.

It will be still further understood by one of ordinary skill in the art that sensors, transducers, and/or microprocessors may be incorporated into any embodiment the present invention.

It will be still further understood by one of ordinary skill in the art that audio/visual accessories, such as an audio speaker, a microphone, a camera, etc., may be incorporated into any embodiment of the present invention.

It will be still further understood by one of ordinary skill in the art that a supplemental means of securing the apparatus to the head—such as an adjustable strap or elastic headband—may be used to help prevent against slippage and/or dislodging of the head-mounted support during user motion and activity.

Many of the embodiments of the present invention involve off-axis optical configurations, which are susceptible to geometric distortion if care is not taken to "properly align" the elements of the optical train with the eye. In the most basic construct of the present invention, proper alignment corresponds to the effective centers of the image source assembly, the near-eye optic, the adjacent folding optic, and the pupil of the eye (when directed at the near-eye optic) forming a single optical plane, termed the principal optical plane (POP). In the case of a horizontal POP, establishment of the POP corresponds to setting $\alpha=90°$. In other constructs of the invention, one or more non-adjacent folding optics may be used to redirect illumination from the image source assembly to the adjacent folding optic. In such constructs, the first element of the POP is a non-adjacent folding optic. The sections of the optical train leading up to the section constituting the POP are referred to as adjunct optical planes (AOPs). To minimize geometric distortion associated with the AOPs, it is generally preferred that the AOPs be only perpendicular or parallel to the POP. An example of an optical configuration with a single AOP, perpendicular to a horizontal POP has an integral near-eye/adjacent folding optic assembly located at eye level adjacent to the bridge of the nose, a non-adjacent folding optic located at eye level on the opposite side of the ocular cavity, and an image source assembly located below the non-adjacent folding optic next to the cheekbone.

An example of an optical train configuration, according to the present invention, with multiple adjunct optical planes has the image source assembly located below eye level near the cheek bone; a first non-adjacent folding optic located above eye level, directly above the image source assembly; a second non-adjacent folding optic horizontally across from the first non-adjacent folding optic and aligned with the eye (for redirecting a horizontal section of the optical train downwards); an adjacent folding optic located below eye level, directly below the second non-adjacent folding optic; and a near-eye optic located in the general area of a typical bifocal lens (or the reading glass location). The first adjunct optical plane (AOP) is defined by the true and/or effective centers of the real image source, the magnifying stage and first non-adjacent folding optic and is vertically oriented. The second AOP is horizontally oriented and includes only two elements—the first and second non-adjacent folding optics. The POP is vertically oriented and is established by the true and/or effective centers of the second non-adjacent folding optic, the adjacent folding optic, the near-eye optic and the forward gazing eye.

Note the term "effective centers" refers to the fact that, on one hand, an LDE may be asymmetrical thus making it difficult to define a "true" center; and, on another hand, the illuminated portion of an LDE need not coincide with the general center of the element when the projected area of the LDE is larger than the area of the incident illumination (i.e., the "illuminated area"), provided the illuminated area represents a complete, uncropped version of the image source. With regard to the latter point, in other words, the condition of proper alignment requires that the LDE be of sufficient size that the illuminated area corresponds to an uncropped representation of the image source, the center of which is the "effective center".

These and other modifications and applications of the present invention will become apparent to those skilled in the art in light of the following description of embodiments of the invention. However, it is to be understood that the present disclosure of these mechanisms are for purposes of illustrations only and are not to be construed as a limitation of the present invention. All such modifications that do not depart from the spirit of the invention are intended to be included within the scope of the claims and specifications stated within.

BRIEF DESCRIPTION OF DRAWINGS

The present invention is further described with reference to the accompanying drawings in which.

DETAILED DESCRIPTION OF THE DRAWINGS

Figure 1:
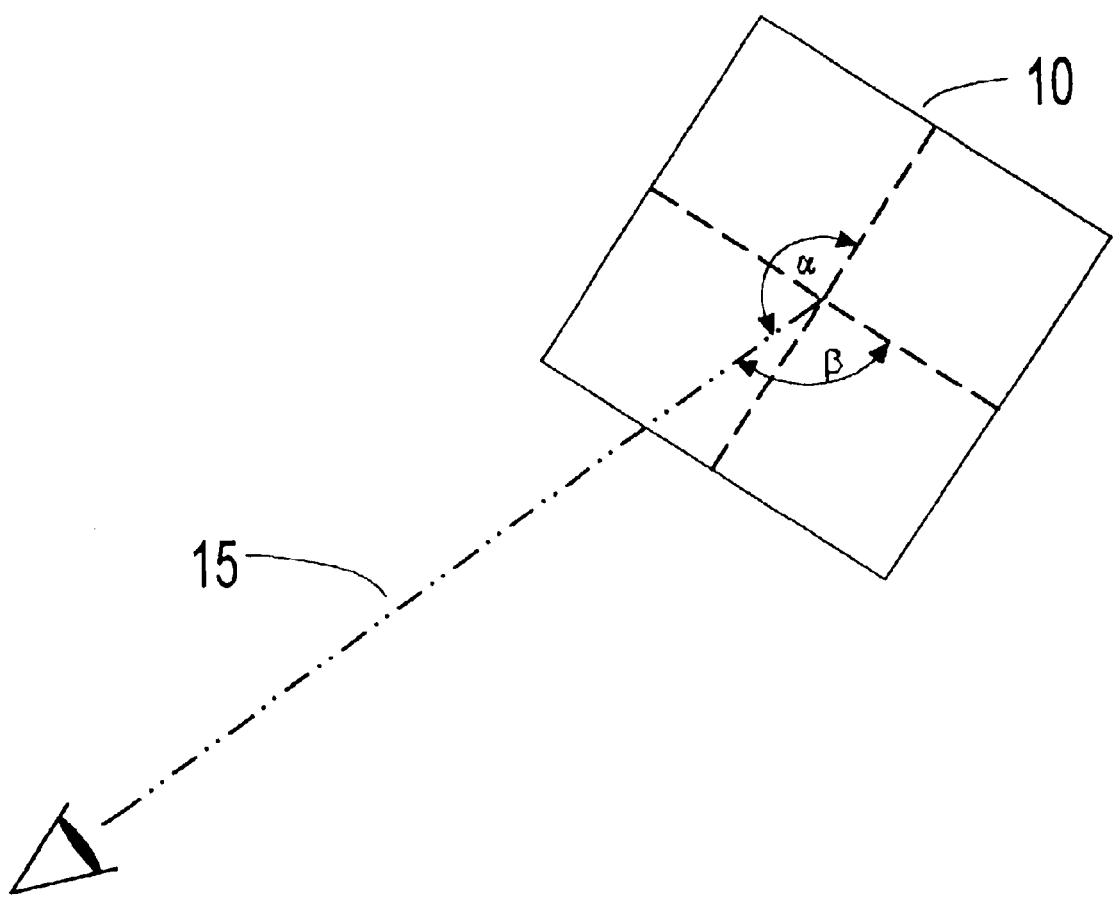
FIG. 1 illustrates the angular orientation of the observable virtual image plane.
Figure 2:
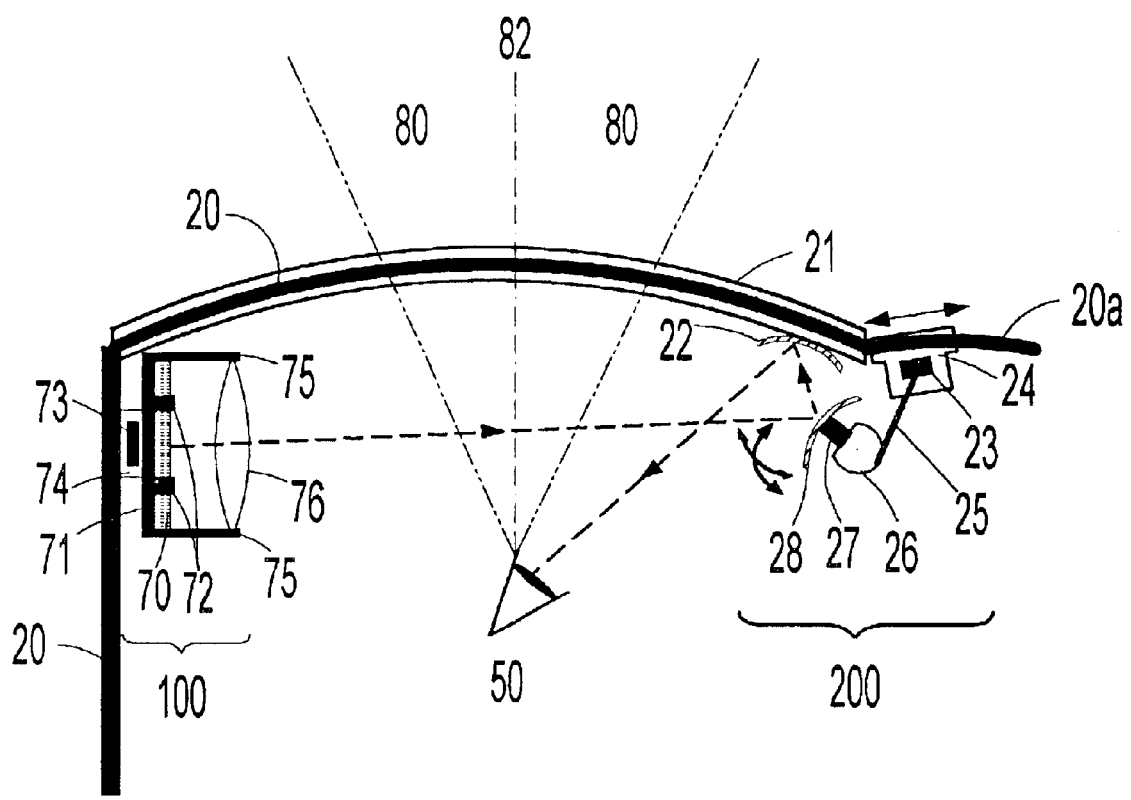
FIG. 2 is a top view of the left half of a glasses-mounted virtual display apparatus, according to the present invention.

In FIG. 1 the angular orientation of the observable virtual image plane (10)—with respect to the optical axis (15) originating at eye—is represented by $\beta$ and $\alpha$. In FIG. 2 the support means of a head-mounted VDA is a conventional spectacle frame (20) with lenses (21). A support bracket (74) connects an image source assembly (100) to the frame near the temple. A holder (71) with tabs (72) firmly secures the real image source (70)—a microdisplay—in a vertical position, with its face directed towards the bridge of the nose. Integral with the image source holder is a holder (75) for the magnifying stage (76), which is centered on and positioned in front of the microdisplay. Across the ocular cavity from the image source assembly, an extended near-eye optic (22) is rigidly affixed to the inner surface of the left lens. (As such the lens serves as an integral near-eye optic holder and support bracket.) A folding optic assembly (200) is movably attached to the bridge crosspieces (20a) of the spectacle frame. A rotatable, powered adjacent folding optic (28) redirects illumination from the image source assembly to the near-eye optic, which further redirects the illumination to the eye (50). The second alignment means (which is used to establish $\beta=90°$) is comprised of a ball (27) and socket (26) connection (or ball joint) positioned between the folding optic and its holder. The ball joint is attached to a two-piece adjacent folding optic support bracket (23 and 24) via a holder consisting of a pair of rigid arms (25) (of which only the top one is visible in this view).

Figure 3:
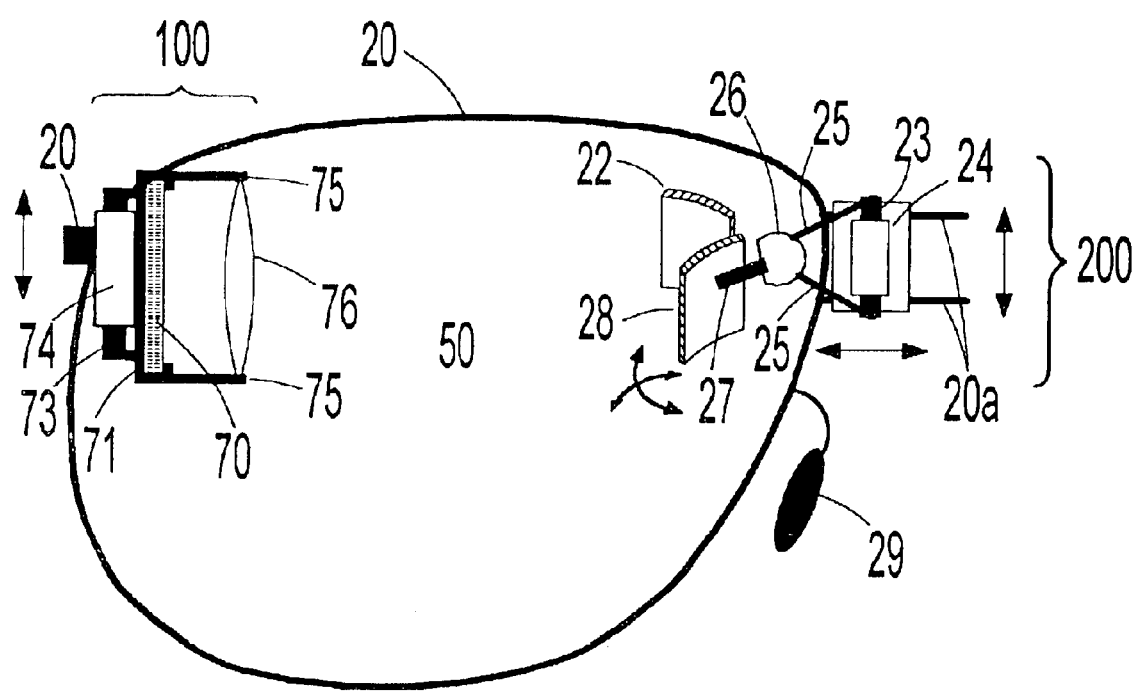
FIG. 3 is a back view of the glasses-mounted virtual display apparatus of FIG. 2.

More clearly evident in FIG. 3 are the two holder arms (25) that extend the adjacent folding optic into ocular cavity and one of the two nose pads (29) that support the frame on the bridge of the nose. The first alignment means (used to establish the horizontal POP) is comprised of an extended near-eye optic and a pair of translational motion mechanisms (TMMs). Specifically, the TMMs are stick-friction sliding mechanisms (SFSMs), which are integrated into the image source and adjacent folding optic assemblies to allow the image source and adjacent folding optic to be aligned with the eye (50). The contact tracks of the image source SFSM are the smooth inner surfaces of a vertical, rectangular channel constructed into the fixed component (74) of a two piece image source support bracket. The second component of the image source support bracket is a moveable rectangular bar (73), which fits snugly inside the channel and whose smooth outer surfaces serve as the runners of the image source SFSM. The image source holder (71) is attached to the ends of the rectangular bar. A similar SFSM is used to align the adjacent folding optic with the eye. The contact tracks of the folding optic SFSM are the smooth walls of a vertical rectangular channel incorporated into the fixed component (24) of a two-piece adjacent folding optic support bracket. The mated runners are the smooth outer surfaces a moveable rectangular bar (23), which fits snugly inside the vertical channel. The two arms forming the adjacent folding optic holder (25) are attached to the ends of the rectangular bar.

Figure 4:
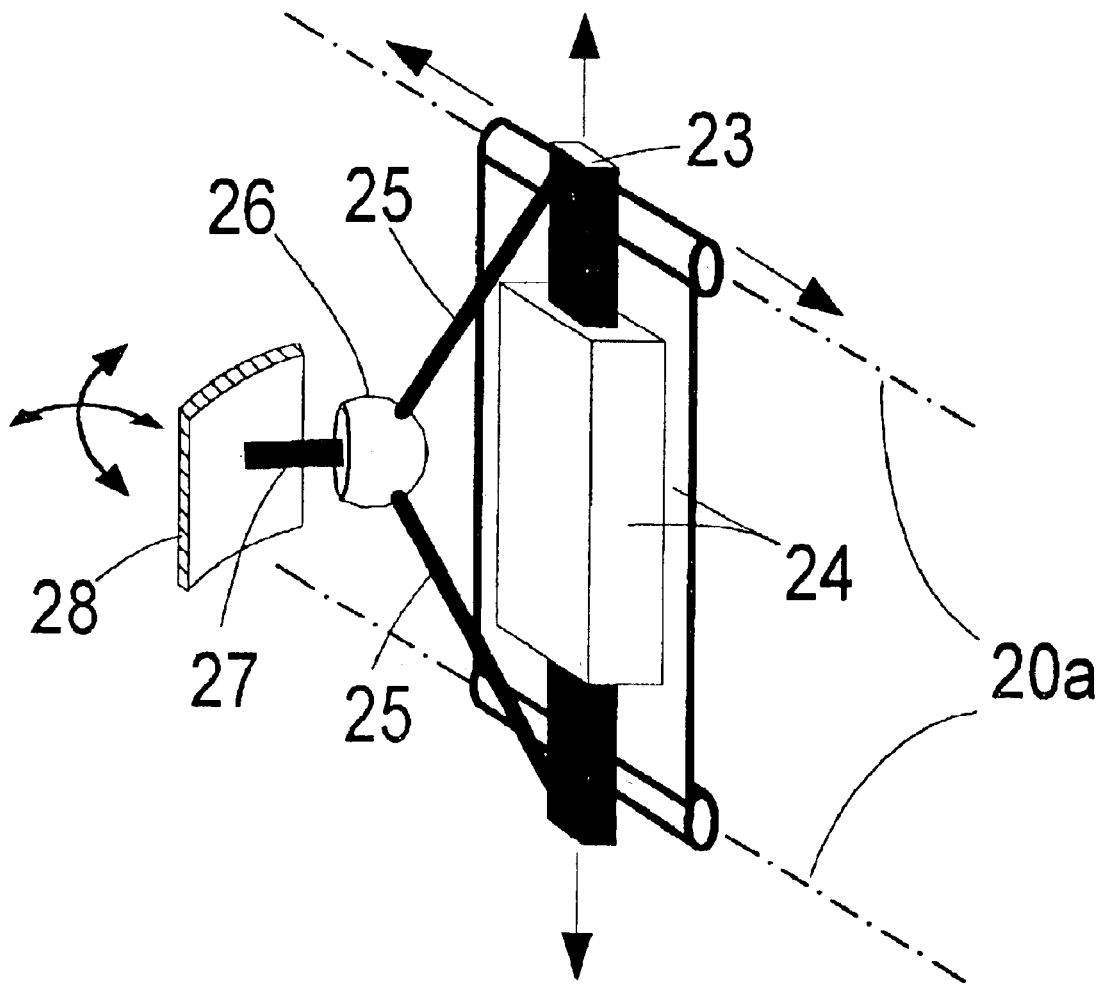
FIG. 4 is a perspective view of the folding optic assembly of the glasses-mounted virtual display apparatus of FIG. 2.

FIG. 4 shows more clearly the nature of the focusing means. A SFSM between the folding optic support bracket (24) and the frame (20) allows the distance between the magnifying stage (76) and the adjacent folding optic (28) to be changed to alter the distance of the observable VIP from the eye. Smooth runners integrated into the support bracket allow the folding optic assembly to movably engage and slide across the smooth contact tracks provided by the surfaces of the bridge crosspieces (20a).

Unobstructed forward vision (80) is qualitatively represented by the region between the dotted lines extending outwards from the eye in FIG. 2. Unobstructed forward vision (or the unobstructed forward FOV) is defined with respect to the forward line-of-sight (82). For the purposes of this invention, unobstructed forward vision is defined as the volume surrounding the forward line-of-sight (LOS) carved out by a circular cone with its vertex at the center of the pupil and a subtending angle of 17.5 degrees (between the forward LOS and the surface of the cone). This corresponds to an unobstructed forward FOV of 35 degrees or the equivalent of a 17.5 inch visual work area two feet from the eye. For conventional eyewear with an eye relief of 16 mm, the circular cross-sectional area of the "cone of unobstructed forward vision" at the lens is approximately 10 mm in diameter. Exclusion of the entire near-eye optic (and its underlying support structure) from the cone of unobstructed forward vision—corresponding to unobstructed and unobscured forward vision—is a common feature of each embodiment of the present invention.

Normal forward vision (or normal forward FOV) is defined for the purposes of this invention as the volume surrounding the forward LOS carved out by a circular cone with its vertex at the center of the pupil and a subtending angle of 40 degrees (between the forward LOS and the surface of the cone). Normal forward vision is divided into two parts: the unobstructed forward FOV and the normal peripheral FOV (or normal peripheral vision), which is the hollowed-out conical region with inside and outside subtending angles of 17.5 and 40 degrees, respectively.

The visual region outside the cone of normal forward vision is termed the extended peripheral FOV. The near-eye optic may be located anywhere within the normal or extended peripheral fields of view that is readily viewable by the eye, e.g., above or below eye level or adjacent to the bridge of the nose (a natural blind spot). The normal peripheral FOV is wide enough near the bridge of the nose to allow the placement of a near-eye optic, if desired. For spectacles with an eye relief of 16 mm and lenses ground for an inter-pupillary distance of 72 mm (corresponding to an optical center 18 mm below the top of the lens), the width of the normal peripheral FOV at the inner surface of the lens near the bridge of the nose is approximately 15 mm.

DESCRIPTION OF THE PREFERRED EMBODIMENT

The preferred embodiment of the present invention is a GMD, based on a pair of safety glasses, for providing access to electronic information in a mobile workplace environment, be it in the field (e.g., by an insurance claims adjuster) or on the factory floor (e.g., by a technician maintaining an assembly line operation). Moreover, the preferred embodiment is a multi-user glasses-mounted VDA that provides to different users a complete, uncropped virtual representation of the image source.

The support means is a structural member with suitable means for mounting the image source, folding optic, additional optics and near-eye optic assemblies. The support means may be of unitary construction, may be composed of more than one attached and connected elements or pieces, or may be composed of a plurality of attached and connected pieces, provided the various components of the optical train remain properly aligned during mobile activities. In addition to structurally supporting the various assemblies of VDA, the support means may include standard mounting means for separably and detachably mounting the virtual display apparatus to a separate head-mounted support/apparatus. Moreover, the support means may be rigidly affixed or partially or fully integrated into a head-mounted support or the transparency means of a head-mounted support, or the support means may be a head-mounted support (HMS) or the transparency means of a head-mounted support. The preferred support means is integrated into a head-mounted support. More specifically, the preferred support means is integrated into a spectacle-type frame of molded plastic construction. The support means may be constructed from plastic, metal, a polymer or other appropriate material or combination of materials.

A transparency means—comprising zero, one, two, three, four or a plurality of transparencies—may be rigidly or detachably attached and connected to the head-mounted support of an embodiment of the invention, to provide vision correction, magnification, an internal optical pathway and/or protective shielding. As used herein, a transparency is defined as a relatively thin optical element (such that parallax error is minimal) of a highly transmissive and transparent nature that covers a region of the face. The transparency means may cover one or both eyes, one eye and other facial areas, both eyes and other facial areas (such as a protective visor or face-shield), portions of one or both eyes and/or other facial areas, or only facial areas. Part or all of a transparency may provide optical power, as in the cases of reading glasses and prescription lenses; or a transparency may be completely unpowered, as in the case of a protective shield. In addition, a refractive optical element may be integrated into and embedded within a transparency to provide magnification of a selected portion of the normal forward field of view. For example, a refractive element may be embedded in a transparency below eye level, in a fashion analogous to the bifocal area of a spectacle lens; or refractive elements for vision correction may be integrated into a face-shield. Furthermore, transparencies may overlap one another, as in the case when a face-shield covers the eyes, nose and mouth and prescription lenses (attached to the head-mounted support) lie behind the face-shield. In the case of conventional eyewear, the transparency means typically comprises separate transparencies (or lenses) covering each eye, which may have optical power for vision correction. An HMD or headset with zero transparencies is referred to as a lensless headset for the purposes of this invention. The transparency means may be constructed from plastic, glass, a polymer or other appropriate (outwardly) transparent material or combination of materials. The transparency means may be integrally formed with a head-mounted support, the support means and/or elements of one or more assemblies of the VDA using standard manufacturing methods, such as molding, casting, machining or laser cutting. The preferred transparency means is a pair of plastic lenses integrally formed with a lens holder by molding.

The optical pathway of an embodiment of the invention may be partially or completely internally disposed within: (i) any optically transparent structural components of the VDA (i.e., the support mean, holders, support brackets, etc.), (ii) any optically transparent portions of an integral or detachable head-mounted support, and/or (iii) a transparency means. More typically the optical pathway of an embodiment of the invention is entirely external of the structural components of the VDA (and any associated head-mounted support or transparency means), corresponding to a free-space optics embodiment. For example, for a head-mounted VDA (or headset) with a face-shield, the optical pathway may pass through the face-shield (via internal reflection) to a near-eye optic located in the normal peripheral FOV. The preferred embodiment is a free-space optics embodiment, in which the optical pathway is entirely external of the integral support means, head-mounted support and transparency means.

The real image source (or illumination source) is typically, but not exclusively, a miniature electronic display module, which displays alphanumeric text, graphical elements and/or video. The real image source may be selected from a monochrome alphanumeric display with just a few lines of text (the equivalent of a simple pager display), a monochrome or color alphanumeric/graphics display with multiple lines (the equivalent of a PDA or cellular telephone type display), a monochrome or color VGA/SVGA microdisplay (the equivalent of a computer monitor) or other appropriate illumination source. Other suitable illumination and visible light sources include visual lasers and light emitting diodes. The preferred illumination source is a color SVGA microdisplay.

A focusing means (in close proximity to the magnifying stage holder) adjustably and controllably brings the observable VIP within the near/far point range of each user and changes the apparent image distance from the eye to allow image placement. The preferred focusing means is selected for focused observable virtual image establishment and achievement at a desired apparent distance from the user's eye; and is additionally selected to provide adjustable and controllable translational motion of the magnifying stage coincident with the optical train axis between the real image source and the magnifying stage. Alternatively, image focusing and placement may be achieved by (i) changing the relative position of any optical element with power, (ii) increasing or decreasing the optical path length by changing the relative position of an appropriate element without optical power (e.g., moving the display closer to the magnifying stage), or (iii) an appropriate combination of relative distance changes involving two or more powered or unpowered optical train elements (which result in a change in the effective focal length of the optical system). An adjustable and controllable focusing means, according to the invention, may be comprised of two or more separate and distinct elements physically engaged and in contact with one another and includes at least one element selected to provide (at least two continuous) contact tracks and at least one element physically engaged with (and maintaining at least three contact points with at least two of) said contract tracts and selected to provide runner means (or runners), whose surface configuration is mated or matched to the surface configuration of the contact tracks. In general, the runner means move relative to the stationary contact tracks to provide a translational motion (or translation) mechanism. The mated surfaces of the contact track and runners may be smooth, toothed, threaded-groove or any other appropriate meshing or mated surface configuration disposed for translational motion of the runners relative to the contact tracks. In addition, the contact tracks may be shaped to generate a rectilinear or curvilinear locus/path of motion.

The means of actuating the focusing means may be mechanical, electrical, electro-optical or electromechanical in nature. In addition, for a magnifying stage comprised of one or more lenslet arrays or a stack of lenslet arrays, the type of micro-actuation means (i.e., electrostatic, magnetic, piezoelectric, bimetallic, etc.) used in micro-electromechanical systems may be employed. When the magnifying stage is comprised of bulk optical elements, the preferred actuation means is a so-called stick-friction sliding mechanism (SFSM). An SFSM is a translational motion mechanism (TMM) in which static friction between the runners and contact tracks prevents relative motion unless sufficient force is applied to the runners to overcome the static friction. The focusing means of the preferred embodiment is incorporated into the image source assembly and employees an electrostatic micro-actuation mechanism for adjustably and controllably translating a stack of lenslet arrays.

When the near-eye optic is located in the normal or extended peripheral FOV, redirection of the optical path towards the eye of the user and orientation of the observable VIP (to establish one-or two-dimensional orthogonality) typically requires one or more light deflection elements (i.e., light deflecting optic, LDO) and a pair of alignment means (termed the first and second alignment means herein) to accommodate the varying eye positions of different users. The first and second alignment means are comprised of active and/or passive components (disposed for orthogonal alignment of the observable virtual image plane with the optical axis in image space to establish one- or two-dimensional orthogonality). Active means of alignment typically take the form of one or more articulating connections (i.e., moveable connections) disposed for translational and/or rotational motion of one or more LDOs, such as the near-eye and adjacent folding optics. Passive means of alignment refers to any means orienting the observable VIP without the use of moveable connections and includes the use of extended LDOs or refractive optics, and image warping electronics. (Note that operation of the image warping electronics may involve integration of a control switch into the VDA or headset).

For an CCOC, establishing orthogonality (one- or two-dimensional) typically requires first establishing the POP and then rotationally orienting one- or more LDOs with respect to axes generally perpendicular to the POP. For example, establishing two-dimensional orthogonality in the case of a horizontal optical configuration, first requires aligning the forward gazing eye with the effective centers of image source assembly (or non-adjacent folding optic), the adjacent folding optic and the near-eye optic to establish the POP (and establish $\alpha=90°$). This may involve the use of independent moveable connections to vertically translate the image source assembly and an integral near-eye and adjacent folding optic assembly. The second step in establishing two-dimensional orthogonality requires rotation of at least one LDO—preferably the adjacent folding optic—to frame the virtual image for each different user and establish $\beta=90°$. The number of moveable connections needed to establish the POP may be reduced by using elongated LDOs for the near-eye and adjacent folding optics. Alternatively, geometric distortion associated with non-establishment of the POP may be minimized or eliminated passively through the use of image warping electronics integrated into the electrical and electronic means associated with the real image source.

Active means of establishing of the POP typically involves the use of TMMs to adjustably and controllably move optical train elements in a direction generally perpendicular to the POP (but may, depending on the optical train configuration, involve the use of one or more rotational motion mechanisms or RMMs, either exclusively or in combination with one or more TMMs). In the most basic construct of the invention (i.e., a single horizontal or vertical optical plane), the first alignment means is comprised of independent and simultaneously adjustable TMMs for the image source assembly, the adjacent folding optic and the near-eye optic. More typically, a first moveable connection with translational motion capabilities is incorporated into an attachment and connection of the image source assembly and a second TMM is incorporated into an attachment and connection of an integral near-eye/adjacent folding optic assembly. (In combination with elongated LDOs, a multi-user embodiment with only a single translation mechanism may be constructed, without the use of image warping electronics).

Each translational motion mechanism (TMM) forming part of the alignment means is comprised of two or more separate and distinct elements integral with or attached and connected the support means, one or more elements of the image source, near-eye optic, adjacent foldign optic, non-adjacent folding optic, magnifying stage and/or additional optics assemblies, or a combination of these VDA components. A TMM forming part of the alignment means includes at least one element selected to provide (at least two continuous) contact tracks and at least one element physically engaged with the contact tracks and selected to provide runner means, whose surface configuration is mated or matched to the surface configuration of the contact tracks; wherein the runner means is selected to provide engagement and maintenance of at least three contact points with at least two of said contact tracks. In general, the runner means move relative to stationary contact tracks. The mated surfaces of the contact tracks and runners may be smooth, toothed, threaded-groove or any other appropriate meshing or mated surface configuration disposed for translational motion of the runners relative to the contact tracks. In addition, the contact tracks may be shaped to generate a rectilinear or curvilinear path of motion. An example of a suitable TMM is a linear translation mechanism with mated smooth surfaces, such as the SFSM (used for focus control) in FIG. 4.

A second alignment means is used to frame the observable virtual image (i.e., to present to different users a complete, uncropped virtual representation of the image source) and further orient the observable VIP to establish and achieve one- or two-dimensional orthogonality. The second alignment means is typically comprised of one or more moveable connections disposed for changing the angular orientation of one or more elements in the POP (relative to axes generally perpendicular to the POP). A typical moveable connection comprising part of the second alignment means takes the form of a finely adjustable RMM (but may, depending on the optical train configuration, involve the use of one or more TMMs, either exclusively or in combination with one or more RMMs). An RMM is selected to provide at least one degree of rotation about an axis generally perpendicular to the POP. An RMM is typically incorporated into an attachment and connection of one of the VDA assemblies and may take the form of a simple (one degree of freedom of rotation) hinge, a multiple-degree of freedom of rotation hinge (e.g., a ball joint), or other appropriate rotational motion mechanism providing a suitable degree of rotational or pivoting motion. Typically, an off-axis or (folded on-axis) optical configuration requires the use of RMMs for the active portion of the second alignment mechanism; while an on-axis optical configuration requires the use of TMMs.

For example, in the case of a vertical POP, an RMM for moving the near-eye or adjacent folding optic allows up-and-down adjustment of the illuminated area incident upon the near-eye optic to establish $\alpha=90°$. While, in the case of a horizontal POP, a comparable RMM allows side-to-side adjustment of the illuminated area incident upon the near-eye optic to establish $\beta=90°$. In the event it is desirable to center the illuminated area (for example when the size of the near-eye optic is minimized), it may be necessary to have two RMMs: one for motion perpendicular to the POP and one for motion parallel to the POP. Alternatively, a single RMM with multiple degrees of freedom of rotation may be used to provide movement of the illuminated area both perpendicular and parallel to the POP. More generally, whenever the size of an LDE is minimized, it may be necessary to incorporate one or more RMMs (and/or one or more TMMs) to allow movement of that LDE or movement of one or more preceding LDEs in order to match the illuminated area with the projected area of the LDE and establish orthogonality.

Each RMM comprising part of the first or second alignment means is comprised of two or more separate and distinct elements integral with or attached and connected to the support means, one or more elements of the image source, near-eye optic, adjacent folding optic, non-adjacent folding optic, magnifying stage and/or additional optics assemblies, or a combination of these VDA components. An RMM forming part of the alignment means includes at least one element selected to provide (at least two continuous) contact tracks and at least one element physically engaged with the contact tracks and selected to provide runner means, whose surface configuration is mated or matched to the surface configuration of the contact tracks; wherein the runner means is selected to provide engagement and maintenance of at least three contact points with at least two of said contact tracks. In general, the runner means move relative to the stationary contact tracks. The mated surfaces of the contact tracks and runners may be smooth, toothed, threaded-groove or any other appropriate meshing or mated surface configuration disposed for rotational motion of the runners relative to the contact tracks. In addition, the contact tracks may be shaped to generate a single curvilinear path of motion.

Furthermore, to maintain and preserve an orthogonal relationship between the POP and a adjunct optical plane or between two AOPs, an RMM may be used to provide a means of rotation of the non-adjacent folding optic (at the intersection of the two planes) about an axis parallel to the axis of intersection between the planes.

The actuation mechanism(s) for active components of the first and second alignment means may be of a mechanical, electrical, electro-optical and/or electromechanical nature, and may include micro-actuation means (i.e., electrostatic, magnetic, piezoelectric, bimetallic, etc.) of the type typically employed in micro-electromechanical systems. For example, a miniature linear drive mechanism or miniature electric motor may be used to drive/actuate moveable connections comprising part of the alignment means.

In some embodiments of the invention, one or more extended (or elongated) optics providing light deflection means (i.e., extended LDOs) may be used as passive means of alignment to decrease the number of moving parts (i.e., to decrease the number of moveable connections). As used herein, an extended LDO is defined as an LDO (such as the near-eye or adjacent folding optics) whose surface area is greater than the minimum area required to fully redirect the incident illumination in a resolute manner. An extended LDO thus allows the location of the incident illumination redirected by an LDO to vary from one user to another without cropping or cutting off a portion of the virtual representation of the image source. For example, for an embodiment without image warping electronics, when all the LDOs in the POP are elongated (with their largest dimension generally perpendicular to the POP) only a single TMM is required to align the elements of the image source assembly with the eye to establish the POP. In other embodiments without image warping electronics, the use of an extended LDO for the near-eye optic can eliminate the need to simultaneously rotate both the near-eye optic and the adjacent folding optic (as is generally required if the size of the LDOs is always kept to a minimum). In general, the degree of LDO elongation required for a given construction is that necessary to always capture an uncropped, resolute observable virtual image over the entire range of motion of the active elements of the alignment means. Passive alignment means may also involve the use of standard passive beam steering techniques, such as the use of decentered lenses, provided due regard is given to the additional image degrading factors arising.

In an embodiment of the present invention where the real image source is an element of the POP, the first alignment means may be selected from the group of:

(i) image warping electronics incorporated into the electrical and electronic means, wherein the image warping electronics is disposed for geometrical distortion correction;

(ii) a moveable connection disposed for translation of the real image source, an extended near-eye optic and an extended adjacent folding optic; wherein the real image source, the adjacent folding optic and the near-eye folding optic are configured to allow establishment of the POP;

(iii) a pair of moveable connections disposed for independent translation of the real image source and the near-eye optic, and an extended adjacent folding optic; wherein the real image source, the adjacent folding optic and the near-eye folding optic are configured to allow establishment of the POP;

(iv) a pair of moveable connections disposed for independent translation of the real image source and the adjacent folding optic, and an extended near-eye optic; wherein the real image source, the adjacent folding optic and the near-eye folding optic are configured to allow establishment of the POP;

(v) a moveable connection disposed for translation of the real image source, and a moveable connection disposed for simultaneous translation of the near-eye optic and the adjacent folding optic; wherein the real image source, the adjacent folding optic and the near-eye folding optic are configured to allow establishment of the POP.

For example, in case (v), a pair of moveable connections may be used to independently and simultaneously vertically translate the real image source and an integral near-eye/adjacent folding optic to establish a horizontal POP.

Note that generally articulation and adjustment of the real image source using translational and rotational motion mechanisms implies simultaneous and comparable articulation and adjustment of the magnifying stage.

In an embodiment of the present invention where the real image source is an element of the POP, the second alignment means may be selected from the group of:

(i) image warping electronics incorporated into the electrical and electronic means, wherein the image warping electronics is disposed for geometric distortion correction;

(ii) a moveable connection disposed for rotation of the near-eye optic about an axis generally perpendicular to the POP;

(iii) a moveable connection disposed for rotation of the adjacent folding optic about an axis generally perpendicular to the POP;

(iv) a moveable connection disposed for rotation of the real image source about an axis generally perpendicular to the POP;

(v) a pair of moveable connections disposed for independent rotation of the near-eye optic and the adjacent folding optic about axes generally perpendicular to the POP;

(vi) a pair of moveable connections disposed for independent rotation of the real image source and the near-eye optic about axes generally perpendicular to the POP;

(vii) a pair of moveable connections disposed for independent rotation of the real image source and the adjacent folding optic about axes generally perpendicular to the POP;

(viii) a moveable connection disposed for simultaneous rotation of the near-eye optic and the adjacent folding optic about axis generally perpendicular to the POP.

For example, for the embodiment shown in FIG. 2, a single moveable connection provides rotational articulation of the adjacent folding optic, corresponding to case (iii).

Note in some embodiments of the invention a moveable connection disposed for rotation of the real image source about an axis generally perpendicular to the POP may be replaced by a moveable connection disposed for translation of the image source assembly parallel to POP. For example, in the case of the single optical plane embodiment represented in the FIGS. 2 and 3, in which the near-eye optic is immovable, it is natural for mounting purposes to place the image source—more or less—flush against the earpiece. However, if the center of the adjacent folding optic is somewhat forward of the center of the image source, the image source is typically tilted with respect to the optical train axis between these two elements. Even a small tilt angle, on the order of five degrees, leads to a noticeable level of geometric distortion. In addition, if the image source assembly is attached to a hinged earpiece, the tilt angle may vary from user to user. Furthermore, if the adjacent folding optic is used for focusing and image placement, the angle of tilt will vary for different adjacent folding optic positions. This source of geometric distortion may be alleviated, in part, mechanically by allowing the image source assembly to rotate about an axis generally perpendicular to the POP or by translation of the image source assembly in the plane of the POP, such that the normal to the image source surface coincides with the optical train axis (i.e., such that the tilt is eliminated).

In an embodiment of the present invention where the real image source is not an element of the POP (i.e., in an embodiment in which the real image source is part of an adjunct optical plane and a folding optic—not adjacent to the near-eye optic; that is, a non-adjacent folding optic—is the first element of the POP), the first alignment means may be selected from the group of:

(i) image warping electronics incorporated into the electrical and electronic means, wherein the image warping electronics is disposed for geometric distortion correction;

(ii) a moveable connection disposed for translation of the non-adjacent folding optic, an is extended near-eye optic, and an extended adjacent folding optic; wherein the non-adjacent folding optic, the adjacent folding optic and the near-eye folding optic are configured to allow establishment of the POP;

(iii) a pair of moveable connections disposed for independent translation of the non-adjacent folding optic and the near-eye optic, and an extended adjacent folding optic; wherein the non-adjacent folding optic, the adjacent folding optic and the near-eye folding optic are configured to allow establishment of the POP;

(iv) a pair of moveable connections disposed for independent translation of the non-adjacent folding optic and adjacent the folding optic, and an extended near-eye optic; wherein the non-adjacent folding optic, the adjacent folding optic and the near-eye folding optic are configured to allow establishment of the POP;

(v) a moveable connection disposed for translation of the non-adjacent folding optic and a moveable connection disposed for simultaneous translation of the near-eye optic and the adjacent folding optic; wherein the non-adjacent folding optic, the adjacent folding optic and the near-eye folding optic are configured to allow establishment of the POP.

For example, in case (v), a pair of moveable connections may be used to vertically translate the non-adjacent folding optic and an integral near-eye/folding optic to achieve and establish a horizontal POP.

In an embodiment of the present invention where the real image source is not an element of the POP, the second alignment means may be selected from the group of:

(i) image warping electronics incorporated into the electrical and electronic means, wherein the image warping electronics is disposed for geometric distortion correction;

(ii) a moveable connection disposed for rotation of the near-eye optic about an axis generally perpendicular to the POP;

(iii) a moveable connection disposed for rotation of the adjacent folding optic about an axis generally perpendicular to the POP;

(iv) a moveable connection disposed for rotation of the non-adjacent folding optic about an axis generally perpendicular to the principal optical plane;

(v) a pair of moveable connections disposed for independent rotation of the near-eye optic and the adjacent folding optic about axes generally perpendicular to the POP;

(vi) a pair of moveable connections disposed for independent rotation of the non-adjacent folding optic and the near-eye optic about axes generally perpendicular to the principal optical plane;

(vii) a pair of moveable connections disposed for independent rotation of the adjacent folding optic and the non-adjacent folding optic about axes generally perpendicular to the principal optical plane (viii) a moveable connection disposed for simultaneous rotation of the near-eye optic and the adjacent folding optic about axis generally perpendicular to the POP.

An embodiment with one AOP in addition to the POP, corresponding to case (vii), is as follows: the image source assembly is located above eye level near the eyebrow, a non-adjacent folding optic is located above eye level, generally centered the eye; the near-eye and adjacent folding optics are located below eye level, generally centered on the eye; a pair of RMMs provide independent rotational articulation and adjustment of the non-adjacent folding optic and the adjacent folding optic.

It is advantageous in some embodiments of the invention, which include a head-mounted support, to include an alternative active means of alignment in the form of an adjustable (nose) bridge support (ABS). An appropriate adjustable bridge support may include an RMM and/or TMM. An ABS with rotational articulation (i.e., a rotational ABS) provides a means for tilting the head-mounted support from side-to-side to ensure that the VDA support means is not skewed relative to the user's face. A rotational ABS may take the form a pair of malleable bridge support arms, bendable metal-flange type nose pads that can be pinched together, a ball-and-socket connection or other suitable means of "squaring-off" or aligning the support means to the user's face (as occurs during "fitting" of prescription eyewear). (A rotational ABS may be incorporated into a detachable VDA in accord with the invention to perform the analogous function.) An ABS with translational articulation (i.e., a translational ABS) allows the support means to be vertically adjusted relative to the nose. For example, a translational ABS may be used in conjunction elongated LDOs for the near-eye and adjacent folding optics to create a simplified construction (i.e., a construction with a minimum number of moving parts) according to the present invention, in the special case of a horizontal POP. More specifically, when the optical train elements of the POP are all effectively centered on one another and are fixed in place (with respect to motion perpendicular to the POP), a translational ABS will bring the eye into proper alignment with the optical train to establish the POP. A translational ABS may take the form of a SFSM, bendable arms with moveable nose pads at the ends, a stationary bridge support with bendable metal-flange type nose pads that can be pinched together, or other suitable means for vertical adjustment (i.e., raising and lowering) of the support means relative to the bridge of the nose. A translational ABS is particularly well suited for an embodiment of the present invention that requires the spectacle plane of the headset to lie further from the face than conventional eyewear for the purpose of allowing the device to be placed over eyeglasses.

Adjunct optical planes (AOPs) are generally rigidly established in embodiments of this invention. Additional alignment means, however, may be required if elements involved in the establishment of the adjunct optical planes cannot be readily fixed in place without giving rise to additional sources of geometric distortion. Thus, construction and user considerations may necessitate the use of the same type of active and passive alignment means described for establishing the POP to establish the AOP(s).

In summary, geometrical distortion may be minimized or eliminated in an embodiment of the present invention using a first appropriate combination of active and passive means of alignment (for the first alignment means), in combination with a second appropriate combination of active and passive means of alignment (for the second alignment means). Typically, for a multi-user embodiment of the invention, this involves a pair of moveable connections to establish one- or two-dimensional orthogonality—even when the light deflection means are all extended LDOs. There are three exceptions to this general "rule": (1) the use of image warping electronics (IWE) enables the number of moveable connections to be reduced to either one or zero; (2) some embodiments based on the one-dimensional orthogonality condition with no means of adjusting the value of α (such that α varies slightly from user to user) require only a single moveable connection (even without employing IWE); and (3) custom fit embodiments, where all the VDA elements are positioned to minimize geometrical distortion for a specific user. (Note a custom fit embodiment of the present invention may, if desired, include no moveable connections, no elongated LDOs and no bridge support adjustment.) It is generally preferred that the number of moveable connections be kept to a minimum.

It follows from rule one that an embodiment of the present invention may be constructed with no moveable connections via the use of exclusively passive means of alignment. Specifically, for this case, the image warping electronics are disposed for orthogonal alignment of the observable virtual image plane with the optical axis in image space to establish one- or two-dimensional orthogonality.

The preferred alignment means consists of an elongated near-eye optic and separate and simultaneously adjustable active means of aligning the real image source and the adjacent folding optic with the eye to create a horizontal POP. In addition, image warping electronics are used to establish $\beta=90°$ for each user. The active means of alignment take the form of sick-friction sliding mechanisms with smooth mated surfaces.

Note that in all embodiments of the invention in which the POP is non-vertical and non-horizontal, establishing $\beta=90°$ and α (preferably equal to 90°) cannot be done independently. In other words, both the first and second alignment means must be employed to establish either one- or two-dimensional orthogonality.

It is further noted that translation or rotation of the entire optical train may substitute, respectively, for translation or rotation of individual VDA elements.

The focusing and alignment means are typically associated with and incorporated into the attachments and connections of different assemblies or different attachment and connections of the same assembly. However, construction considerations (particularly in the case of integral assemblies, like an integral near-eye/adjacent folding optic assembly) may necessitate the incorporation of the focusing and alignment means into the same attachment and connection.

The near-eye optic (or near-eye LDO) provides a light deflection means (positioned in the normal peripheral field of view for unobstructed forward vision attainment) and is disposed for simultaneous illumination reception from an adjacent folding optic (or the magnifying stage) for observable virtual image formation and illumination redirection to the user's eye. The near-eye optic may also provide supplemental magnification of the real image source (and/or aberration reduction, polarization, or other standard optical means of visible light manipulation) and is positioned in the normal or extended peripheral FOV to provide unobstructed forward vision. For example, a partially reflective near-eye optic may be used to superimpose an observable virtual image on the surroundings, or a curved or flat, fully reflective first-surface mirror may be used to totally occlude a small portion of the normal peripheral FOV. The preferred near-eye optic is a flat, fully reflective first-surface mirror, consisting of a plastic substrate with vapor deposited aluminum and transparent protective coatings.

A near-eye optic assembly comprising a support bracket, holder and near-eye optic may be mounted to, integrated into or attached and connected to the support means (which may be a head-mounted support or the transparency means of a head-mounted support), one or more elements of the image source, adjacent folding optic, non-adjacent folding optic, magnifying stage and/or additional optics assemblies, or a combination of these VDA components. The near-eye optic assembly may be located anywhere in the normal or extended peripheral FOV. For example, it may be located at eye level adjacent to the bridge of the nose, below eye level or above eye level. In addition, the near-eye optic may be placed in front or behind a lens or transparency. The preferred location of the near-eye optic assembly is below eye level and generally centered on the eye (i.e., corresponding to an interpupillary distance of between 50 and 74 mm). The support bracket and holder of the near-eye optic assembly may be comprised of any number of separate and distinct elements attached and connected to one another and may be formed together in an integral fashion. In addition, the support bracket or an integral support bracket and holder may be integrally formed with the support means, one or more elements of the image source, adjacent folding optic, non-adjacent folding optic, magnifying stage and/or additional optics assemblies, or a combination of these VDA components using standard manufacturing methods.

A focusing means may be partially or fully incorporated into (i.e., partially or fully integrated into or attached and connected to) the near-eye optic assembly. The focusing means may be incorporated into the attachment and connection between the near-eye optic support bracket and the support means. Alternatively, the focusing means may be incorporated into the attachment and connection between the support bracket and the near-eye optic holder or the near-eye optic and its holder. In addition, one or more moveable connections of the first and/or second alignment means may be partially or fully incorporated into the near-eye optic assembly. Moveable connections may be incorporated into the attachment and connection between the near-eye optic and its holder, which is the generally preferred location. Construction considerations, however, may necessitate incorporating moveable connections into the attachment and connection between the support bracket and the holder or between the support bracket and the support means. In the preferred embodiment no focusing or alignment means are incorporated into the near-eye optic assembly.

Temporary detachment and separation of the near-eye optic assembly from the support means or of individual elements of the assembly (for parts replacement or upgrading) may be achieved by incorporating construction appropriate and standard mounting means of tightly but detachably securing individual components and elements together (i.e., standard mounting means of removably mounting, fastening, connecting, gripping and clamping components in place to prevent movement between them), such a male-female connector, a snap-together type fastener or a spring-tensioned clamp. More specifically, the attachment and connections between the support means and the near-eye optic support bracket, the support bracket and the near-eye optic, and the near-eye optic and its holder may be of a detachable and separable nature to allow temporary detachment and separation of the near-eye optic or the entire assembly.

Articulating means may be used to move the near-eye optic (and any underlying support elements) outside the normal peripheral field of view when the VDA is not in use. More specifically, an articulating means, selected to provide at least one degree of freedom of motion, may be used to move the near-eye optic from its operational position in the normal peripheral FOV to the extended peripheral FOV, to provide unobstructed normal peripheral vision when the VDA is not in use. Articulating means may be incorporated into the attachment and connection between the near-eye optic and its holder, which is the generally preferred location. Construction considerations, however, may necessitate incorporating the articulating means into the attachment and connection between the near-eye optic support bracket and holder or between the support means and the support bracket. For example, in the case of an integral transparency and near-eye optic assembly, which covers most of the face (i.e., a face-shield), an articulating means between the head-mounted support and the transparency allows the face-shield to be raised from its operational position when either the display apparatus is not in use or the protective function of the face-shield is not needed. A suitable articulating means has at least one degree of freedom of translation or rotation and may be simultaneously detachable. The preferred embodiment does not include an articulating means.

An image or illumination source assembly, comprising a real image source (in communication with electrical and electronic means), a support bracket, image source and magnifying stage holders, and a magnifying stage (in close proximity to the real image source), may be mounted to, integrated into or attached and connected to the support means, one or more elements of the near-eye optic, adjacent folding optic, non-adjacent folding optics, magnifying stage and/or additional optics assemblies, or a combination of these VDA components. The image source assembly is typically located in the extended peripheral FOV, but may be located in the normal peripheral FOV. The preferred location of the image source assembly is above eye level near the user's temple. The support bracket and holders of the image source assembly may each be comprised of any number of separate and distinct elements attached and connected to one another and may be formed in an integral fashion. In addition, the support bracket or an integral support bracket and holder may be integrally formed with the support means, one or more elements of the near-eye optic, adjacent folding optic, non-adjacent folding optic, magnifying stage and/or additional optics assemblies, or a combination of these VDA components using standard manufacturing methods.

A focusing means may be partially or fully incorporated into the image source assembly. The focusing means may be incorporated into the attachment and connection between magnifying stage and its holder, which is the generally preferred location. Construction considerations, however, may necessitate incorporating the focusing means into the attachment and connection between the image source support bracket and image source holder, the image source and magnifying stage holders, or the support bracket and the support means. In the preferred embodiment, a focusing means is incorporated into the attachment and connection between the magnifying stage and its holder. In addition, one or more moveable connections of the first and/or second alignment means may be partially or fully incorporated into the image source assembly. Moveable connections may be incorporated into the attachment and connection between the image source support bracket and the support means, which is the generally preferred location. Construction considerations, however, may necessitate incorporating moveable connections into the attachment and connection between the support bracket and an integral image source/magnifying stage holder, or between an integral image source/magnifying stage holder and between an integral image source/magnifying stage.

Temporary detachment and separation of the image source assembly from the support means or of individual elements of the assembly (for parts replacement or upgrading) may be achieved by incorporating construction appropriate and standard mounting means of tightly but detachably securing parts together. More specifically, the attachment and connections between the support means and the image source support bracket, the support bracket and the image source holder and/or the magnifying stage holder, the real image source and its holder, the image source and magnifying stage holders, and the magnifying stage and its holder may be of a detachable and separable nature to allow temporary detachment and separation of the assembly, the magnifying stage and/or the real image source.

The magnifying stage may be held by or incorporated into an assembly separate and distinct from—but in close proximity to and of similar basic construct to—the image source assembly. A separate magnifying stage assembly may be integrally formed with the support means, one or more elements of the image source, near-eye optic, adjacent folding optic, non-adjacent folding optic and/or additional optics assemblies, or a combination of these VDA components using standard manufacturing methods.

The magnifying stage is disposed for simultaneous illumination reception from the real image source for first intermediate image formation and illumination transmission to the adjacent (or non-adjacent) folding optic and is selected to provide primary magnification of said real image source. In addition, the magnifying stage is comprised of at least one bulk optical element, a single two-dimensional lenslet array, a stack of two-dimensional lenslet arrays, or other suitable means of magnification. A suitable magnifying stage comprised of one or more bulk optical elements includes, but is not limited to, a simple magnifier, a multi-surfaced magnifier, or a compound magnification system comprised of refractive, reflective, diffractive, gradient index and/or holographic optical elements, surfaces and/or gratings, intermediate surfaces, optical coatings, and/or other standard optical means of visible light manipulation. The description of lenslet array systems by Burger in U.S. Pat. No. 6,124,974 (titled "Lenslet Array Systems and Methods") is incorporated in its entirety by reference herein. Briefly, a lenslet (or microlens) array refers to a two-dimensional array of microlenslets, comprised of refractive or non-refractive microlenslets. Typically there is one-to-one correspondence between the pixels of the real image source and the microlenslets of the lenslet array. A "stack" of lenslets arrays generally refers to a plurality of lenslet arrays (arranged substantially adjacent to one another) forming an array of lenslet channels. The preferred magnifying stage is a lenslet array stack providing magnification, aberration correction and collimation.

An embodiment of the present invention may constructed using a single LDO—that is, only the near-eye optic. The disadvantage of a single LDO embodiment is that the near-eye optic cannot normally be kept parallel to the spectacle plane, thus resulting in a less compact form factor. To allow more compact constructions, it is advantageous to use an additional light deflection means (or folding optic) adjacent to the near-eye optic.

A folding optic is a light deflecting element other than the near-eye optic, which folds the optical path. An adjacent folding optic is typically disposed for simultaneous illumination reception from the magnifying stage or a non-adjacent folding optic for (respectively, second or third) intermediate image formation (in the most basic construct of the invention) and illumination redirection to, respectively, an adjacent folding optic or the near-eye optic. In addition, an adjacent folding optic may provide supplemental magnification, aberration reduction, polarization and/or other standard optical means for visible light manipulation. Moreover, all folding optics are positioning in the normal or extended peripheral FOV. (Note, in general, any intermediate image—whether formed by the magnifying stage, a folding optic or additional optics—may be virtual or real.)

A folding optic assembly (for either an adjacent or non-adjacent folding optic) comprising a support bracket, holder, and at least one folding optic may be mounted to, integrated into or attached and connected to the support means, one or more elements of the near-eye optic, image source, magnifying stage, and/or additional optics assemblies, or a combination of these VDA components. The holder and support bracket of a folding optic assembly may be comprised of any number of separate and distinct elements attached and connected to one another and may be integrally formed together. In addition, the support bracket or an integral folding optic support bracket and holder may be integrally formed with the support means, one or more elements of the near-eye optic, image source, magnifying stage and/or additional optics assemblies, or a combination of these VDA components using standard manufacturing methods.

A focusing means may be partially or fully incorporated into a folding optic assembly. The focusing means may be incorporated into the attachment and connection between the folding optic support bracket and the support means, which is the generally preferred location. Construction considerations, however, may necessitate incorporating a focusing means into the attachment and connection between the folding optic support bracket and holder or between the folding optic and its holder. In addition, one or more moveable connection of the first and/or second alignment means may be partially or fully incorporated into a folding optic assembly. A moveable connection may be incorporated into the attachment and connection between the folding optic and its holder, which is the generally preferred location. Construction considerations, however, may necessitate incorporating a moveable connection into the attachment and connection between the support bracket and holder or between the support bracket and the support means.

Temporary detachment and separation of a folding optic assembly from the support means or of individual elements of the assembly (for parts replacement or upgrading) may be achieved by incorporating construction appropriate and standard means of tightly but detachably securing parts together. More specifically, the attachment and connections between the support means and the folding optic support bracket, the folding optic support bracket and holder, or between the folding optic and its holder may be of a detachable and separable nature to allow temporary detachment and separation of the assembly or the folding optic.

In the preferred embodiment an adjacent folding optic assembly is located below eye level, adjacent to the near-eye optic assembly and is integrally formed with the near-eye optic assembly; and a non-adjacent folding optic is positioned above eye level, generally centered on the eye and horizontally across from the image source assembly. The preferred adjacent folding optic is a flat, first-surface mirror. An RMM between the attachment and connection of the adjacent folding optic and its holder allows rotation about and axis generally perpendicular to the POP.

Additional optical means—such as aspheric refractive elements; non-adjacent folding optics (to increase the optical path length or further fold the optical train); filters; optical coatings; beamsplitters; intermediate image surfaces; diffractive, gradient index, polarizing and holographic optical elements, surfaces and gratings; microlens arrays, and/or other standard optical means of visible light manipulation—may be added to a construct of the present invention anywhere along the optical pathway between the real image source and the eye to achieve standard optical means of visible light manipulation. (This includes placing refractive elements between the near-eye optic and the eye.) For example, a diffractive optical element may be added to an optical train containing a number of plastic elements to correct for color aberrations, or an intermediate image surface—such as a screen or Fresnel lens—may be added to balance aberrations and other unwanted artifacts. Additional optical means may be comprised of a single additional optical element (AOE), more than one AOE or a plurality of AOEs. Additional optical means (also referred to herein as additional optics) may be incorporated into or detachably and separably mounted to the image source, adjacent folding optic, non-adjacent folding optic, magnifying stage and/or near-eye optic assemblies using appropriate means of mounting and attachment and connection. In addition, AOEs may be added to the VDA via separate "additional optics" assemblies, which may support and hold one or more AOE.

An additional optics assembly comprising a support bracket, holder and additional optics may be mounted to, integrated into or attached and connected to the support means, one or more elements of the near-eye optic, image source, magnifying stage, and/or adjacent or non-adjacent folding optic assemblies, or a combination of these VDA components. Moreover, the support bracket and holder of an additional optics assembly may be comprised of any number of separate and distinct elements attached, connected and in close proximity to one another, and may be integrally formed. Furthermore, the additional optics support bracket or an integral support bracket and holder may be integrally formed with the support means, one or more elements of the image source, magnifying stage, near-eye optic, and/or adjacent or non-adjacent folding optic assemblies, or a combination of these VDA components using standard manufacturing methods.

A focusing means may be partially or fully incorporated into an additional optics assembly. The focusing means may be incorporated into the attachment and connection between the additional optics support bracket and the support means, which is the generally preferred location. Construction considerations, however, may necessitate incorporating the focusing means into the attachment and connection between the additional optics support bracket and holder or between an AOE and its holder.

Temporary detachment and separation of the additional optics assembly from the support means or of individual elements of the assembly (for parts replacement or upgrading) may be achieved by incorporating construction appropriate and standard means of tightly but detachably securing parts together. More specifically, the attachment and connections between the additional optics support bracket and holder, the support bracket and the support means, and/or the holder(s) and the AOE(s) may be of a detachable and separable nature to allow temporary detachment and separation of the assembly or the additional optics. In the preferred embodiment, a bulk, convex refractive element is place between the near-eye optic and the eye to minimize the eye relief of the device, with the additional optics assembly is integrated into an integral near-eye/folding optic assembly.

The optical path length of a VDA in accord with the invention may be increased through the use fiber optics, such as a bundle of coherent optical fibers or a flexible light pipe, or a graded index lens conduit. The pathway of such light conduits may be curvilinear or rectilinear. For example, an optical fiber bundle (or cable) may carry light from the real image source to the magnifying stage when the magnifying stage is not located immediately adjacent to the image source assembly, but rather is attached and connected to the support means via a separate and distinct assembly a short distance from the image source.

An embodiment of the invention may include one or more optical trains. Each optical train may be distinct and independent or may share common segments. For example, a biocular VDA may be constructed using a single display by splitting the optical pathway into two distinct paths after the pathway exits the image source assembly, with the two paths leading to a pair of near-eye optics (generally centered on the eyes either above or below eye level). Or, a binocular VDA may be constructed using two completely separate and distinct optical trains with separately controllable image sources (i.e., a dual channel modality) being virtually projected by two near-eye optics, both positioned either above or below eye level and generally centered on the eyes. Alternatively, a dual monocular VDA may be created by incorporating separate optical trains into the left and right hand sides of the apparatus and placing the two near-eye optics at locations not simultaneously observable, such as below eye level, centered on the eye for the left eye and above eye level, near the temple of the right eye. Moreover, a multi-monocular VDA may be created by placing multiple near-eye optics at various peripheral locations, provided care is taken not to simultaneously display distinct virtual images. For example, as with a heads-up display, different information related to the task at hand (e.g., such as operation of a vehicle, monitoring body conditions during aerobic activity, or any general activity requiring "multi-tasking" or quick access to different sources of information) may be readily accessed while maintaining primary focus on the forward field of view. Thus with the same eye, the user may view different sources of information when looking in different directions. Separate image sources may be used for each near-eye optic or a single image source may provide images for more than one eyepiece. In the latter case, separate optical trains may lead to each near-eye optic or portions of each optical train may be made redundant to minimize the number of required optical elements.

A portion or all of the elements of a VDA constructed apparatus according to the invention may be enclosed in housings, which may be mounted to, integrated into, or attached and connected to the support means, elements of one or more of the VDA assemblies, or a combination of these VDA components. Any and all housings may be of a detachable and removable nature to allow temporary separation.

The various assemblies of the invention may be constructed from plastic, metal, a polymer or other appropriate material or combination of materials. The preferred material is plastic. As used herein, electrical and electronic means is comprised, but not limited to, an electrical power source (e.g., a battery or external power source), electrical circuitry, electronics, and a signal source (such as a data/video signal source or a computer output, preferably an SVGA output). The electrical circuitry should be capable of receiving video and computer output signals via electrical wiring, via fiber optical cabling, via infrared link, via a radio frequency link, or via any appropriate mode of wired or wireless signal transmission. Electrical wiring may pass through an attached conduit or may be integrated into or attached and connected to the support means, elements of one or more of the VDA assemblies, or a combination of these VDA components. In addition, the electrical and electronics means should be capable of scanning and synchronizing a video signal, and interfacing and displaying a computer output.

Lastly it is noted that, when taken together, the series of assemblies added to a support means, in combination with the attachments and connections that allow temporary separation and detachment of one or more assembly (including separation and detachment of the support means from a head-mounted support), provide modular construction capabilities. For example, a head-mounted support (with transparency means) may serve as the "chassis" for multiple embodiments of the invention, where each embodiment involves a different set of assemblies, different locations for the assemblies or a combination of both cases. More generally, a modular approach may be used to construct user-specific or custom-fit devices, where the same support means (with appropriate mounting means for attachment and connection of the various assemblies) may be mounted to or integrated into various types of conventional eyewear; with the optical train characteristics being based on the user's requirements (i.e., the combination of optical train elements provide both the desired degree of magnification, the desired apparent image distance, and correction for the user's specific optical deficiency).

Description of Another Embodiment

Another embodiment of the present invention is a lensless virtual display headset with clip-on microdisplay and integral near-eye/adjacent folding optic assemblies, positioned to form an off-axis optical configuration. A two-piece spectacle-type frame wraps around the head from ear to ear at eyebrow level and rests on the bridge of the nose. The attachment and connection between the bridge support piece and primary frame piece is a translational ABS for establishing a horizontal POP. Flexible nose pads, consisting of thin metal extensions coated with a deformable and pliable polymer, may be pinched together or spread apart to allow the device to be securely and comfortably fit to different users. Flexible earpieces, consisting of a bendable, gooseneck type shaft coated with a pliable polymer, provide a further degree of adaptability for different users. Indentations in the primary frame piece—at the bridge of the nose and near the temple—mate with extensions integrated into the support brackets of each assembly to provide an unshakeable mounting means. The image source assembly is an integral unit housing an SVGA microdisplay (and associated electrical interconnects) and a short focal length magnifier, which is positioned approximately 10 mm in front of the display. The mated indentations and extensions are constructed to direct the optical axis of the image source and magnifier towards the adjacent folding optic at the bridge of the nose, which is integrated into the near-eye optic assembly. The folding optic is a low power convex mirror, which serves to reduce the level of spherical distortion in the optical train. The near-eye optic is a concave mirror of moderate focal length. A toothed-gear (linear) translation mechanism integrated into the image source assembly allows translation of the magnifier for focus control and image placement. This translation mechanism consists of a rotatable tooth-edged dial (for fingertip adjustment) mated with a strip of teeth integrated into the magnifying stage support bracket. A ball joint allows rotation of the adjacent fold optic for image framing and establishment of β=90°.

Description of a Further Embodiment

A further embodiment of the present invention is a headset with a single transparency covering most of the face. This device is constructed for use in laboratory environments where the transparency protects the soft tissues of the eyes, mouth and nose from harmful liquids. The transparency extends from the chin to the eyebrow and is attached to a single piece HMS that wraps around the front of the head at eyebrow level. A hinged connection allows the transparency to be moved from its vertical functional position to a horizontal (non-functional) position. An inch clearance between the face and transparency provides room for air circulation to minimize fogging and space for the virtual display assemblies (of an off-axis optical configuration). An integral near-eye and adjacent folding optic assembly, with integral focusing and alignment means, is attached to the HMS above the bridge support. The image source assembly is integrated into the HMS at the temple across the ocular cavity from the near-eye/adjacent folding optics assembly. The first alignment means consists of extended near-eye and folding optics and a stick-friction sliding mechanism for vertically aligning the display with the eye. The second alignment means is an RMM positioned between the adjacent folding optic holder and support bracket. The device may be customized for a single user by attaching prescription lenses to the frame.

EXAMPLE

A glasses-mounted VDA is constructed by adding two non-detachable assemblies—for an adjacent folding optic and a microdisplay (Planar AMEL 640×480 monochrome microdisplay)—to a metal spectacle frame (Limited Editions: Style SST 20; Size 57/18 145). The first alignment means consists of an extended near-eye optic and (stick-friction) translational motion mechanisms (TMMs) integrated into the image source and adjacent folding optic assemblies. A hinge for small angle rotation of the display is incorporated into the image source assembly as a part of the second alignment means. A stick-friction sliding mechanism, incorporated into the attachment and connection between the bridge crosspieces and the adjacent folding optic support bracket, provides an adjustable and controllable focusing mechanism. A hinge, incorporated into the attachment and connection between the adjacent folding optic holder and support bracket is another component of the second alignment means.

Two 20 mm pieces of ¼ inch square plastic tubing (Evergreen Scale Models: StripStyrene Part No. 257), placed side-by-side, are glued together with cyanoacrylate to form the support bracket of the image source assembly. The support bracket is oriented vertically and affixed to the frame with hot glue after threading the right earpiece through the bottom opening and reattaching the earpiece to the lens holder. The interior surfaces of a 12 mm long ⅛×¼ inch piece of rectangular tubing (Evergreen Scale Models: Strip-Styrene Part No. 254) provides the contact tracks of the TMM for vertical translation of the microdisplay. This piece is secured to the support bracket with cyanoacrylate and hot glue. The cross-sectional area of the tubing is just large enough for the insertion of three 25 mm long pieces of 1/16 inch brass tubing (K&S Engineering Part No. 149), the outer surfaces of which serve as runners. This combination of smooth surfaced contact tracks and runners produce a easily adjustable stick-friction sliding mechanism.

The hinge for rotation of the image source is established by movably mounting a U-shaped element to the ends of the middle runner of the TMM for vertical translation of the microdisplay. The U-shaped element is formed from a 41 mm piece of 0.025×¼ inch brass stripping (K&S Engineering Part No. 235) by adding 90 degree bends at and 33 mm. The hinge is formed by first drilling holes in the parallel sides of the U-shaped piece equidistant from the bends and in the middle brass tubing runner, and then attaching these elements with washers and screws (Midwest Fastener Corp. Parts No. 64087C and No. 64091J, respectively). The mounting method for this hinge includes placing 5 mm square pieces of a "thin balsa wood/fine-grained emery cloth" laminate (with holes drilled in the middle) onto the exterior ends of the U-shaped piece before mounting the washers and screws, to create a stick-friction rotating mechanism.

An integral microdisplay and magnifying stage holder is attached to the vertical portion of the U-shaped piece. This element is fashioned from a single piece of 0.06 mm thick stainless steel sheet metal (TCT Stainless Steel, Inc. in Sterling Heights, Mich.). Extensions and tabs designed into the holder allow the holder to be firmly clamped to the vertical portion of the rotatable U-shaped piece and the display to be firmly clamped to the holder. A square simple magnifier—created by squaring off the "sides" of a circular plano/convex lens (Edmunds Industrial Optics No. C45-123)—is positioned 12 mm in front of the microdisplay and attached to the extensions with hot glue.

The bridge crosspieces serve as the contact tracks of the focusing means. Integral runners are fashioned into the support bracket. The support bracket of the adjacent folding optic assembly is created from a 23 mm long piece of 0.032×¼ inch brass stripping (K&S Engineering Part No. 240) with folds at and 18 mm. From behind the lens holder, the folds are placed in contact with the crosspieces, folded over and clamped down. Next the TMM for vertical translation of the adjacent folding optic, which is composed of same elements as the TMM for vertical alignment of the microdisplay, is placed atop the bracket support, oriented vertically and immovably secured using cyanoacrylate and epoxy.

The adjacent folding optic holder consists of a G-shaped element movably mounted to the adjacent folding optic TMM in the same fashion that the U-shaped element was mounted the microdisplay TMM. The G-shaped element is a 55 mm long piece of 0.025×¼ inch brass stripping (K&S Engineering Part No. 235) with 90 degree bends at 8, 33 and 45 mm. (Note: The 25 mm long section of this element is vertically oriented and lies in front of the lens holder). Holes for a hinge are drilled in the middle of the two parallel 8 mm sections. The G-shaped element is mounted to the middle brass runner of the adjacent folding optic TMM in the same fashion as U-shaped element. A 12 mm length of ⅛ inch brass tubing (K&S Engineering Part No. 151) is soldered to the outward facing side of the 25 mm section of the G-shaped element to provide a handle. A 8×13 mm piece of 0.005 inch shim brass (K&S Engineering Part No. 250) is soldered to the G-shaped element after the 45 mm bend, to provide a 7–8 mm arm for mounting of the adjacent folding optic. The adjacent folding optic is attached to the arm with epoxy.

The substrate of the near-eye optic is an approximately 11×17 mm section of a plano lens with a radius of curvature of 144 mm. The reflective coating is a self-adhesive reflective film made by 3M Corporation (Product No. 7323FL). The near-eye optic is hot glued to the spectacle lens (a plastic plano lens) adjacent to the bridge crosspieces. In this embodiment, the lens serves as an integral near-eye optic support bracket and holder. (Alternatively, the lenses may be omitted and the near-eye optic may be attached directly to the metal frame and the underwire of the lens holder may be removed. In this lensless embodiment of the present invention, the metal spectacle frame serves as an integral near-eye optic support bracket and holder.)

What is claimed is:

1. A virtual display apparatus based on a cross-cavity optical configuration comprising:

a support means attached and connected to a near-eye optic assembly comprising:
 a near-eye optic attached and connected to
 a near-eye optic holder attached and connected to
 a near-eye optic support bracket attached and connected to said support means;
 furthermore said support means is additionally attached and connected to an adjacent folding optic assembly comprising:
 an adjacent folding optic attached and connected to
 an adjacent folding optic holder attached and connected to
 an adjacent folding optic support bracket attached and connected to said support means;
 furthermore said support means is additionally attached and connected to an image source assembly comprising:
 a real image source, in communication with electrical and electronic means, attached and connected to
 an image source holder attached and connected to
 an image source support bracket attached and connected to said support means; and
 a magnifying stage holder attached and connected to said image source support bracket;
 and additionally attached and connected to
 a magnifying stage in close proximity to said real image source;
 wherein said magnifying stage is disposed for simultaneous illumination reception from said real image source for first intermediate image formation and illumination transmission to said adjacent folding optic and is selected to provide primary magnification of said real image source;
 wherein said adjacent folding optic provides a light deflection means and is disposed for simultaneous illumination reception from said magnifying stage for second intermediate image formation and illumination redirection to said near-eye optic, and additionally selected to provide supplemental magnification of said real image source; and
 wherein said near-eye optic provides a light deflection means, positioned in the normal peripheral field of view for unobstructed forward vision attainment, and is disposed for simultaneous illumination reception from said adjacent folding optic for observable virtual image formation and illumination redirection to the user's eye; and additionally selected to provide supplemental magnification of said real image source.

2. The virtual display apparatus of claim 1, wherein said magnifying stage is selected from the group consisting of at least one bulk optical element, a single two-dimensional lenslet array, and a stack of two-dimensional lenslet arrays.

3. The virtual display apparatus of claim 1, wherein said support means is attached and connected to an additional optics assembly comprising:

at least one additional optic attached and connected to an additional optic holder attached and connected to an additional optic support bracket attached and connected to said support means;

wherein said additional optic is positioned within the optical train between said real image source and the user's eye, and may be selected to provide supplemental magnification, aberration reduction, polarization and light deflection.

4. The virtual display apparatus of claim 1, wherein said magnifying stage holder is in close proximity to a focusing means selected for focused observable virtual image establishment and achievement at a desired apparent distance from the user's eye; and is additionally selected to provide adjustable and controllable translational motion of said magnifying stage coincident with the optical train axis between said real image source and said magnifying stage.

5. The virtual display apparatus of claim 1, wherein said near-eye optic assembly, said image source assembly, and said adjacent folding optic assemblies are separably and detachably connected to said support means using standard mounting means.

6. The virtual display apparatus of claim 1, wherein said support means is attached and connected to a head-mounted support.

7. The virtual display apparatus of claim 6, wherein said head-mounted support is in contact with the bridge of the user's nose.

8. The virtual display apparatus of claim 6, wherein a transparency means is attached and connected to said head-mounted support; said transparency means selected from the group consisting of zero, one, two, three and four transparencies.

9. The virtual display apparatus of claim 1, wherein said electrical and electronic means includes image warping electronics disposed for geometric distortion correction of the observable virtual image plane.

10. The virtual display apparatus of claim 9, wherein said image warping electronics is
disposed for orthogonal alignment of the observable virtual image plane with the optical axis in image space, selected from the group comprising at least one of one-dimensional orthogonality and two-dimensional orthogonality.

11. The virtual display apparatus of claim 1, wherein a first alignment means and a second alignment means are disposed for orthogonal alignment of the observable virtual image plane
with the optical axis in image space, selected from the group comprising at least one of one-dimensional orthogonality and two-dimensional orthogonality.

12. The virtual display apparatus of claim 11, wherein said first alignment means is selected from the group comprising at least one of:

image warping electronics incorporated into said electrical and electronic means, wherein said image warping electronics is disposed for geometrical distortion correction;

moveable connection disposed for translation of said real image source, an extended near-eye optic and an extended adjacent folding optic; wherein said real image source, said adjacent folding optic and said near-eye folding optic are configured to allow the establishment of the principal optical plane;

a pair of moveable connections disposed for independent translation of said real image source and said near-eye optic, and an extended adjacent folding optic; wherein said real image source, said adjacent folding optic and said near-eye folding optic are configured to allow establishment of the principal optical plane;

a pair of moveable connections disposed for independent translation of said real image source and said adjacent folding optic, and an extended near-eye optic; wherein said real image source, said adjacent folding optic and said near-eye folding optic are configured to allow establishment of the principal optical plane; or a moveable connection disposed for translation of the real image source, and a moveable connection disposed for simultaneous translation of said near-eye optic and said adjacent folding optic; wherein said real image source, said adjacent folding optic and said near-eye folding optic are configured to allow establishment of the principal optical plane.

13. The virtual display apparatus of claim 11, wherein said second alignment means is selected from the group comprising at least one of:

image warping electronics incorporated into said electrical and electronic means, wherein said image warping electronics is disposed for geometric distortion correction a moveable connection disposed for rotation of said near-eye optic about an axis generally perpendicular to the principal optical plane;

moveable connection disposed for rotation of said adjacent folding optic about an axis generally perpendicular to the principal optical plane;

a moveable connection disposed for rotation of said real image source about an axis generally perpendicular to the principal optical plane;

a pair of moveable connections disposed for independent rotation of said near-eye optic and said adjacent folding optic about axes generally perpendicular to the principal optical lane;

a pair of moveable connections disposed for independent rotation of said real image source and said near-eye optic about axes generally perpendicular to the principal optical plane;

a pair of moveable connections disposed for independent rotation of said real image source and said adjacent folding optic about axis generally perpendicular to the principal optical plane; or a moveable connection disposed for simultaneous rotation of said near-eye optic and said adjacent folding optic about axes generally perpendicular to the principal optical plane.

14. A virtual display apparatus based on a cross-cavity optical configuration comprising:

a support means attached and connected to a near-eye optic assembly comprising:
   a near-eye optic attached and connected to
   a near-eye optic holder attached and connected to
   a near-eye optic support bracket attached and connected to said support means
   furthermore said support means is additionally attached and connected to an adjacent folding optic assembly comprising:
   an adjacent folding optic attached and connected to
   an adjacent folding optic holder attached and connected to
   an adjacent folding optic support bracket attached and connected to said support means;
   furthermore said support means is additionally attached and connected to a non-adjacent folding optic assembly comprising:
   a non-adjacent folding optic attached and connected to
   a non-adjacent folding optic holder attached and connected to
   a non-adjacent folding optic support bracket attached and connected to said support means;
   furthermore said support means is additionally attached and connected; to an image source assembly comprising:
   a real image source, in communication with electrical and electronic means, attached and connected to
   an image source holder attached and connected to
   an image source support bracket attached and connected to said support means; and
   a magnifying stage holder attached and connected to said image source support bracket; and additionally attached and connected to
   a magnifying stage in close proximity to said real image source;

wherein said magnifying stage is disposed for simultaneous illumination reception from said real image source for first intermediate image formation and illumination transmission to said non-adjacent folding optic and is selected to provide primary magnification of said real image source and wherein said non-adjacent folding optic provides a light deflection means and is disposed for simultaneous illumination reception from said magnifying stage for second intermediate image formation and illumination redirection to said adjacent folding optic; and wherein said adjacent folding optic provides a light deflection means and is disposed for simultaneous illumination reception from said non-adjacent folding optic for third intermediate image formation and illumination redirection to said near-eye optic, and additionally selected to provide further supplemental magnification of said real image source; and wherein said near-eye optic provides a light deflection means, positioned in the normal peripheral field of view for unobstructed forward vision attainment, and is disposed for simultaneous illumination reception from said adjacent folding optic for observable virtual image formation and illumination redirection to the user's eye; and additionally selected to provide supplemental magnification of said real image source.

15. The virtual display apparatus of claim 14, wherein said magnifying stage is selected from the group consisting of at least one bulk optical element, a single two-dimensional lenslet array, and a stack of two-dimensional lenslet arrays.

16. The virtual display apparatus of claim 14, wherein said support means is attached and connected to an additional optics assembly comprising:
   at least one additional optic attached and connected to
   an additional optic holder adjacent to
   an additional optic support bracket attached and connected to said support means;
   wherein said additional optic is positioned within the optical train between said real image source and the user's eye and may be selected to provide supplemental magnification, aberration reduction, polarization and light deflection.

17. The virtual display apparatus of claim 14, wherein said magnifying stage holder is in close proximity to a focusing means selected for focused observable virtual image establishment and achievement at a desired apparent distance from the user's eye; and is additionally selected to provide adjustable and controllable translational motion of said magnifying stage coincident with the optical train axis between said real image source and said magnifying stage.

18. The virtual display apparatus of claim 14, wherein said near-eye optic assembly, said image source assembly, said adjacent folding optic assembly and said non-adjacent folding optic assembly are separably and detachably connected to said support means using standard mounting means.

19. The virtual display apparatus of claim 14, wherein said support means is attached and connected to a head-mounted support.

20. The virtual display apparatus of claim 19, wherein said head-mounted support is in contact with the bridge of the user's nose.

21. The virtual display apparatus of claim 14, wherein a transparency means is attached and connected to said head-mounted support; said transparency means selected from the group consisting of zero, one, two, three and four transparencies.

22. The virtual display apparatus of claim 14, wherein said electrical and electronic means includes image warping electronics disposed for geometric distortion correction of the observable virtual image plane.

23. The virtual display apparatus of claim 22, wherein said image warping electronics is disposed for orthogonal alignment of the observable virtual image plane with the optical axis in image space, selected from the group comprising at least one of one-dimensional orthogonality and two-dimensional orthogonality.

24. The virtual display apparatus of claim 14, wherein a first alignment means and a second alignment means are disposed for orthogonal alignment of the observable virtual image plane with the optical axis in image space, selected from the group comprising at least one of one-dimensional orthogonality and two-dimensional orthogonality.

25. The virtual display apparatus of claim 24, wherein said first alignment means is selected from the group comprising at least one of:

image warping electronics incorporated into said electrical and electronic means, wherein said image warping electronics is disposed for geometric distortion correction;

a moveable connection disposed for translation of said non-adjacent folding optic, an extended near-eye optic, and an extended adjacent folding optic; wherein said non-adjacent folding optic, said adjacent folding optic and said near-eye folding optic are configured to allow establishment of the principal optical plane;

a pair of moveable connections disposed for independent translation of the non-adjacent folding optic and the near-eye optic, and an extended adjacent folding optic; wherein said non-adjacent folding optic, said adjacent folding optic and said near-eye folding optic are configured to allow establishment of the principal optical plane;

a pair of moveable connections disposed for independent translation of said non-adjacent folding optic and said adjacent the folding optic, and an extended near-eye optic; wherein said non-adjacent folding optic, said adjacent folding optic and said near-eye folding optic are configured to allow establishment of the principal optical plane; or a moveable connections disposed for translation of said non-adjacent folding optic and a moveable connection disposed for simultaneous translation of said near-eye optic and said adjacent folding optic; wherein said non-adjacent folding optic, said adjacent folding optic and said near-eye folding optic are configured to allow establishment of the principal optical plane.

26. The virtual display apparatus of claim 24, wherein said second alignment means is selected from the group comprising at least one of:

image warping electronics incorporated into said electrical and electronic means, wherein said image warping electronics is disposed for geometric distortion correction;

a moveable connection disposed for rotation of said near-eye optic about an axis generally perpendicular to the principal optical plane;

a moveable connection disposed for rotation of said non-adjacent folding optic about an axis generally perpendicular to the principal optical plane;

a moveable connection disposed for rotation of said non-adjacent folding optic about an axis generally perpendicular to the principal optical plane;

a pair of moveable connections disposed for independent rotation of said near-eye optic and said adjacent folding optic about axes generally perpendicular to the principal optical plane;

a pair of moveable connections disposed for independent rotation of said non-adjacent folding optic and said near-eye optic about axes generally perpendicular to the principal optical plane;

a pair of moveable connections disposed for independent rotation of said adjacent folding optic and said non-adjacent folding optic about axes generally perpendicular to the principal optical plane; or a moveable connection disposed for simultaneous rotation of said near-eye optic and said adjacent folding optic about axis generally perpendicular to the principal optical plane.

* * * * *